United States Patent
Todd et al.

(10) Patent No.: US 8,430,775 B2
(45) Date of Patent: Apr. 30, 2013

(54) MULTIPLE TENSION REDUCING SPROCKETS IN A CHAIN AND SPROCKET SYSTEM

(75) Inventors: Kevin B. Todd, Freeville, NY (US); Mariano Garcia, Ithaca, NY (US)

(73) Assignee: BorgWarner Inc., Auburn Hills, MI (US)

( * ) Notice: Subject to any disclaimer, the term of this patent is extended or adjusted under 35 U.S.C. 154(b) by 143 days.

(21) Appl. No.: 11/994,488

(22) PCT Filed: Dec. 26, 2007

(86) PCT No.: PCT/US2007/088828
§ 371 (c)(1), (2), (4) Date: Jun. 11, 2009

(87) PCT Pub. No.: WO2009/041986
PCT Pub. Date: Apr. 2, 2009

(65) Prior Publication Data
US 2010/0292038 A1 Nov. 18, 2010

Related U.S. Application Data

(60) Provisional application No. 60/976,399, filed on Sep. 28, 2007, provisional application No. 60/976,977, filed on Oct. 2, 2007.

(51) Int. Cl.
*F16H 7/08* (2006.01)

(52) U.S. Cl.
USPC .......... 474/148; 474/156; 474/157; 474/152; 474/160

(58) Field of Classification Search ............... 474/156, 474/157, 152, 160, 148
See application file for complete search history.

(56) References Cited

U.S. PATENT DOCUMENTS

| | | |
|---|---|---|
| 515,449 A | 2/1894 | Scovell |
| 530,058 A | 11/1894 | Schaum et al. |
| 571,086 A | 11/1896 | Fulton et al. |

(Continued)

FOREIGN PATENT DOCUMENTS

| | | |
|---|---|---|
| DE | 2014537 | 10/1970 |
| DE | 2338865 | 2/1974 |

(Continued)

OTHER PUBLICATIONS

A Study on Timing Belt Noise (How to Reduce Resonant Noise) Conference Title: Proceedings of the 1989 International Power Transmission and Gearing Conference: New Technologies for Power Transmissions of the 90's; Chicago, Illinois, Apr. 25, 1989.

(Continued)

*Primary Examiner* — William E Dondero
*Assistant Examiner* — Michael Riegelman
(74) *Attorney, Agent, or Firm* — Brown & Michaels, PC

(57) ABSTRACT

In chain and sprocket systems with at least two resonance modes, two or more tension reducing sprockets are oriented to cancel each other at a first resonance mode and have no effect to increase tensions at such first resonance mode. The tension reduction sprockets, however, are oriented with each other so that tensions will be reduced at a second resonance mode. Hence, two or more tension reducing sprockets are used to reduce tensions at a second resonance mode from sources outside the chain and sprocket system while minimizing tension increases at first resonance mode.

29 Claims, 27 Drawing Sheets

U.S. PATENT DOCUMENTS

| | | | |
|---|---|---|---|
| 596,289 | A | 12/1897 | Smith |
| 611,170 | A | 9/1898 | Howard |
| 613,756 | A | 11/1898 | Buddle |
| 1,650,449 | A | 11/1927 | Jaeger |
| 1,936,117 | A | 11/1933 | Peschl |
| 1,963,314 | A | 6/1934 | Savell et al. |
| 2,344,757 | A | 3/1944 | Weisberger |
| 2,477,441 | A | 7/1949 | Cole |
| 2,941,413 | A | 6/1960 | Huber |
| 3,583,250 | A | 6/1971 | Kongelka |
| 3,752,035 | A | 8/1973 | Cozzy et al. |
| 3,752,601 | A | 8/1973 | Karagozian et al. |
| 3,830,212 | A * | 8/1974 | Seino et al. ............... 123/192.2 |
| 3,858,454 | A | 1/1975 | Duff |
| 3,899,932 | A | 8/1975 | Durham |
| 4,036,071 | A * | 7/1977 | McKnight et al. ............ 474/156 |
| 4,168,634 | A * | 9/1979 | Griffel ........................... 474/148 |
| 4,181,034 | A | 1/1980 | Daniel |
| 4,193,324 | A | 3/1980 | Marc |
| 4,337,056 | A | 6/1982 | Bruns |
| 4,504,074 | A | 3/1985 | Smith |
| 4,515,577 | A | 5/1985 | Cathey et al. |
| 4,522,610 | A | 6/1985 | Nagano |
| 4,526,558 | A | 7/1985 | Durham |
| 4,810,237 | A | 3/1989 | Mantovaara |
| 4,865,577 | A | 9/1989 | Freudenstein |
| 4,913,684 | A | 4/1990 | Mantovaara |
| 4,915,598 | A | 4/1990 | Kubis |
| 4,936,812 | A | 6/1990 | Redmond |
| 5,394,282 | A | 2/1995 | Wada |
| 5,397,280 | A | 3/1995 | Skurka |
| 5,427,580 | A | 6/1995 | Ledvina et al. |
| 5,437,581 | A | 8/1995 | Ledvina et al. |
| 5,453,059 | A | 9/1995 | Avramidis et al. |
| 5,490,282 | A | 2/1996 | Dreps et al. |
| 5,492,390 | A | 2/1996 | Kugelmann, Sr. |
| 5,549,314 | A | 8/1996 | Sassi et al. |
| 5,551,925 | A | 9/1996 | Mott et al. |
| 5,562,557 | A | 10/1996 | Ledvina et al. |
| 5,611,744 | A | 3/1997 | Shen |
| 5,683,319 | A | 11/1997 | Mott et al. |
| 5,772,546 | A | 6/1998 | Warszewski |
| 5,816,967 | A | 10/1998 | Ledvina et al. |
| 5,846,149 | A | 12/1998 | Ledvina et al. |
| 5,876,295 | A * | 3/1999 | Young ........................... 474/156 |
| 5,882,025 | A | 3/1999 | Runnels |
| 5,935,046 | A | 8/1999 | Maresh |
| 5,971,721 | A | 10/1999 | Carstensen |
| 5,976,045 | A | 11/1999 | Young |
| 6,019,692 | A | 2/2000 | Kojima et al. |
| 6,050,916 | A | 4/2000 | Hunkert |
| 6,155,943 | A * | 12/2000 | Ledvina et al. ............... 474/156 |
| 6,189,639 | B1 | 2/2001 | Fuse et al. |
| 6,213,905 | B1 * | 4/2001 | White et al. ................... 474/148 |
| 6,932,037 | B2 * | 8/2005 | Simpson et al. ............ 123/90.17 |
| 7,044,875 | B2 * | 5/2006 | Gajewski ....................... 474/148 |
| 7,125,356 | B2 * | 10/2006 | Todd .............................. 474/152 |
| 7,232,391 | B2 * | 6/2007 | Gajewski ....................... 474/141 |
| 7,901,312 | B2 | 3/2011 | Ogo et al. |
| 8,066,602 | B2 * | 11/2011 | Todd .............................. 474/152 |
| 2002/0142873 | A1 | 10/2002 | Oser |
| 2002/0169043 | A1 | 11/2002 | Liu |
| 2003/0087714 | A1 * | 5/2003 | Todd .............................. 474/156 |
| 2003/0104886 | A1 * | 6/2003 | Gajewski ......................... 474/87 |

FOREIGN PATENT DOCUMENTS

| | | |
|---|---|---|
| DE | 3739336 | 11/1989 |
| DE | 4316877 | 11/1993 |
| DE | 4331482 | 3/1994 |
| DE | 4241231 | 11/1994 |
| DE | 19520508 | 12/1996 |
| DE | 19649397 | 6/1998 |
| DE | 19812939 | 1/1999 |
| DE | 20008042 | 9/2000 |
| EP | 0066294 | 12/1982 |
| EP | 1448916 | 8/2006 |
| GB | 1175505 | 12/1969 |
| JP | 63067452 | 3/1988 |
| JP | 63088368 | 4/1988 |
| JP | 63097830 | 4/1988 |
| JP | 63106453 | 5/1988 |
| JP | 63145858 | 6/1988 |
| JP | HEI195536 | 6/1989 |
| JP | 1244116 | 9/1989 |
| JP | 1288657 | 11/1989 |
| JP | 3297792 | 12/1991 |
| JP | 4039444 | 2/1992 |
| JP | HEI4165148 | 6/1992 |
| JP | 5086892 | 4/1993 |
| JP | 5164191 | 6/1993 |
| JP | 6159037 | 6/1994 |
| JP | 6162635 | 6/1994 |
| JP | 6239284 | 8/1994 |
| JP | 8014058 | 1/1996 |
| JP | 10176506 | 6/1998 |
| JP | 10266814 | 10/1998 |
| JP | 10266868 | 10/1998 |
| JP | 10274052 | 10/1998 |
| JP | 2001-032894 | 2/2001 |
| JP | 2001304374 | 10/2001 |
| JP | 2001348809 | 12/2001 |
| JP | 2001349416 | 12/2001 |
| JP | 2003-184996 | 7/2003 |
| JP | 2005510677 A | 4/2005 |
| JP | 2008309171 A | 12/2008 |
| WO | 98/29673 | 7/1998 |
| WO | 03461413 A1 | 6/2003 |

OTHER PUBLICATIONS

Analysis of Nonlinear Vibration of Timing Belt: (Under Meshing Impact and Varying Tension by Eccentric Pulley) Author: Shaochang Li; Hideyuki Otaki; Keiichi Watanuki; Conference Title: Proceedings of the 1995 Joint ASME/JSME Pressure Vessels and Piping Conference.

Vibration and Control of Axially Moving Belt System. 1st Report, Experimental Analysis; Authors: Takano Koetsu ; Keiji Watanabe; Osami Matsushita; Masanori Kitano; Nippon Kikai Gakkai Ronbunshu. C ( Transactions of the Japan Sociey of Mechanical Engineers. C), 1998, vol. 64, No. 618, pp. 421-428, Fig. 20, Tbl. 6, Ref. 8 (w/ English translation).

Vibration and Control of Axially Moving Belt System, 3rd Report, Analysis by Parametric Excitation; Authors: Hiroki Okubo; Kouetsu Takano; osami Matusushita; Keiji Watanabe; Yoshi Hirase Nippon Kikai Gakkai Ronbunshu. C ( Transactions of the Japan Society of Mechanical Engineers. C), vol. 65, No. 635, pp. 2708-2712 (w/ English translation).

Life Analysis of Water Pump Bearing for Cars Considering Shaft Rigidity ; Koyo Eng J, 1989, No. 136, p. 51-63, Fig. 9, Tbl. 1, Ref. 5 (English abstract only).

Analysis of Nonlinear Oscillations of the Timing Belt (1st Report, Regions of Resonance of the Timing Belt); Author—Li, Shao-chang; Otaki, Hideyuki; Ishikawa, Yoshio; Watanuki, Keiichi; Nippon Kikai Gakkai Ronbunshu, C Hen/ Transactions of the Japan Society of Mechanical Engineers, Parc C v 59 n 568 Dec. 1993. p. 3902-3906 (English abstract only).

Parametric Excitation of Timing Belt; Author: Osaki Eiki; Nippon Hakuyo Kikan Gakkaishi (Journal of the Marine Engineering Society in Japan); 1993, vol. 28, No. 5, pp. 320-325 (English abstract only).

Audible Noise Produced by the Sporadic Changes of Tensile Forces in a Belt Driven System; Author: C. Ozturk; (Journal of Low Frequency Noise & Vibration); 1995, V14, N4, pp. 193-211 (English abstract only).

Vibration of Timing Belt Subjected to Fluctuations of Tension; Authors: Osaki Eiki, Miyoshi Yoshihiro; Koga Katsuyuki (Journal of National Fisheries University) 1996, vol. 45, No. 2; p. 79-85 (English abstract only).

Vibration and Control of Axially Moving Belt System. Effect of Inclined Angle; Authors: Hirase Yoshi, Takano Kouetsu; Okubo Hiroki; Matsushita Osami; Watanabe Keiji. Nippon Kikai Gakkai Kikai Rikigaku, Keisoku Seigyo Koen Ronbunshu, 1998, vol. 1998, No. B, pp. 317-320 (English abstract only).

Vibration and Control of Axially Moving Belt System. Effect of Inclined Angle; Authors: Hirase Yoshi, Takano Kouetsu; Okubo Hiroki; Matsushita Osami; Watanabe Keiji. Nippon Kikai Gakkai Kikai Rikigaku, Keisoku Seigyo Koen Ronbunshu, 1999, vol. 1999, No. A, pp. 443-446 (English abstract only).

Study on a Servo Control System Using Timing Belt Drives; Authors: Lee H, Masutomi Tatsuaki, Takesue Naoyki; Sakaguchi Masamichi; Furusho Junji; Tanaka Hideaki; (Proceedings of the Annual Conference of the Institute of Systems Control and Informaton Engineers), 200, vol. 44th pp. 625-626 (English abstract only).

Vibration and Control Axially Moving Belt System, 4th Report, Effect of Inclined Angle by Experiment; Authors: Takano Koetsu; Hirase Yoshi; Okubo Hiroki; Matsushita Osami; Watanabe, Keiji, (Nippon Kikai Gakkai Ronbunshu. C) (Transactions of the Japan Society of Mechanical engineers. C), 2000, vol. 66 No. 645, pp. 1439-1444 (English abstract only).

Vibration Induced in Driving Mechanism of Photoconductor Drum in Color Laser Printer; Author: Kawamoto Hiroyuki; Watanabe Yosuke; Nippon Kikai Gakkai Kikai Rikigaku, Keisoku Seigyo Koen Ronbunshu, 2000, vol. 2000, No. Pt. 4, pp. 1028-1031(English abstract only).

Vibration and Control of Axially Moving Belt System: Analysis and Experiment by Parametric Excitation; Authors: H. Okubo; K. Takano; 0. Matsushita; K. Watanabe; Y. Hirase (Journal of Vibration and Control), 2000, v6, N4 (May) pp. 589-605.

Primary and Parametric Non-Linear Resonances of a Power Transmission Belt: Experimental and Theorectical Analysis; Author: F. Pellicano; A. Freglent; A. Bertuzzi; F. Verstroni (Journal of Sound and Vibration) v. 244 n. 4 pp. 669-684; Jul. 19, 2001 (English abstract only).

Nonlinear Vibration Analysis of Running Viscoelastic Belts; Author: YS Choi; 5th Internet Conference on Vibration Engineering; Proc., Nanjing, CN, Sep. 18-20, 2002 (English abstract only).

Base and Application of Timing Belt, Primary Part 5. Rotation Transmitting Error (Case of No Load); Author: Koyama Tomio; Kagotani Masanori; Kikai no Kenkyu (Science of Machine), 2003, vol. 55, No. 2, pp. 269-278 (English abstract only).

Parametric Instability of Belts: Theory and Experiments; Authors: F. Pellicano (Reprint); G. Catellani; A. Freglent (Computers & Structures) 2004, v82, N1 (Jan), pp. 81-91; ISSN: 0045-7949; Jan. 2004 (English abstract only).

Vibration and Control of Axially Moving Belt System: Analysis and Experiment by Parametric Excitation; Authors: H. Okubo (Reprint); K. Takano; 0. Matsushita; K. Watanabe; Y. Hirase (Journal of Vibration and Control), Sage Publications, Inc. May 2000 (English abstract only).

EPO search report from EP Patent Application No. 02257611, dated Dec. 6, 2004.

* cited by examiner

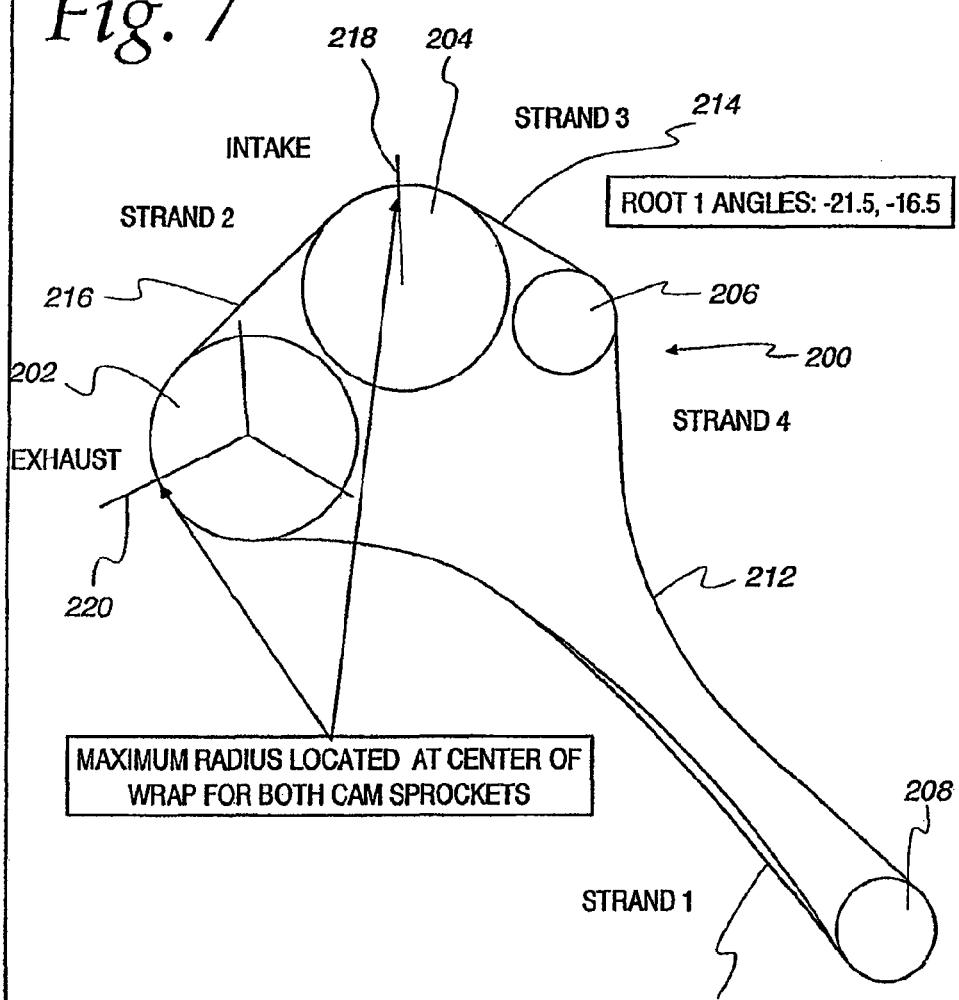

Fig.13 V8 CHAIN SYSTEM DRIVING BOTH BANKS
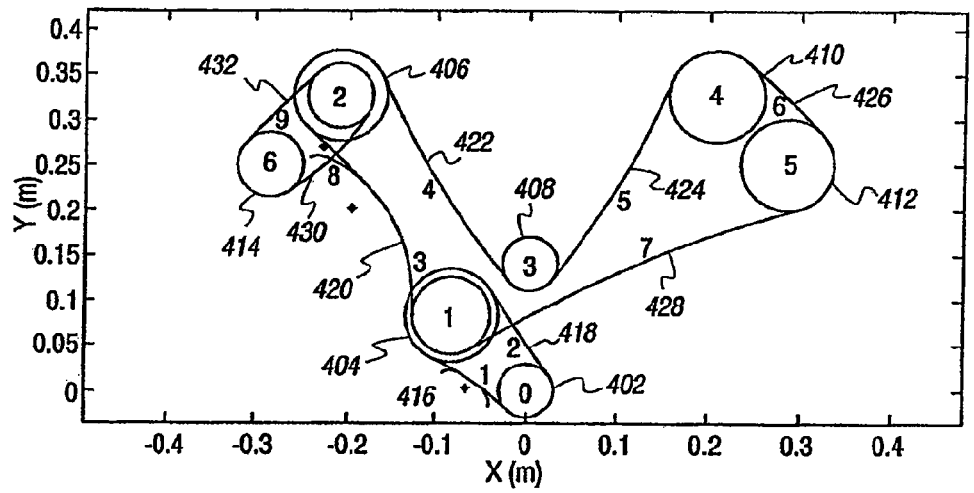
Fig. 13a
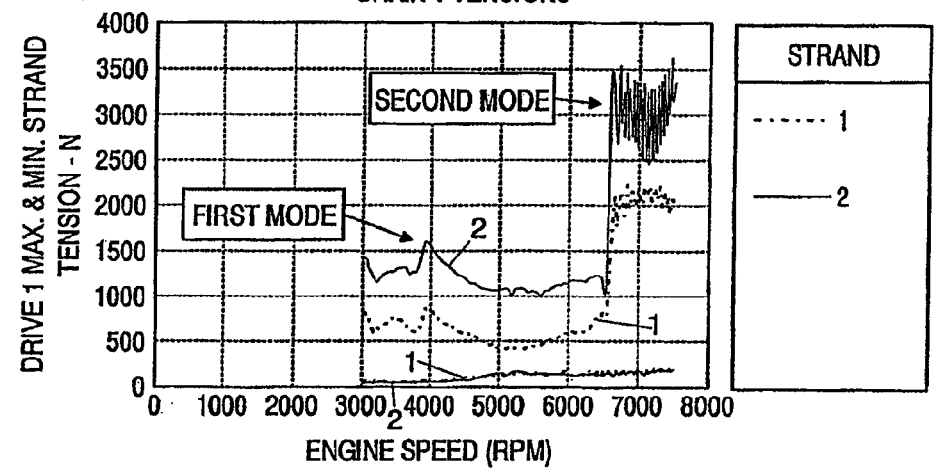

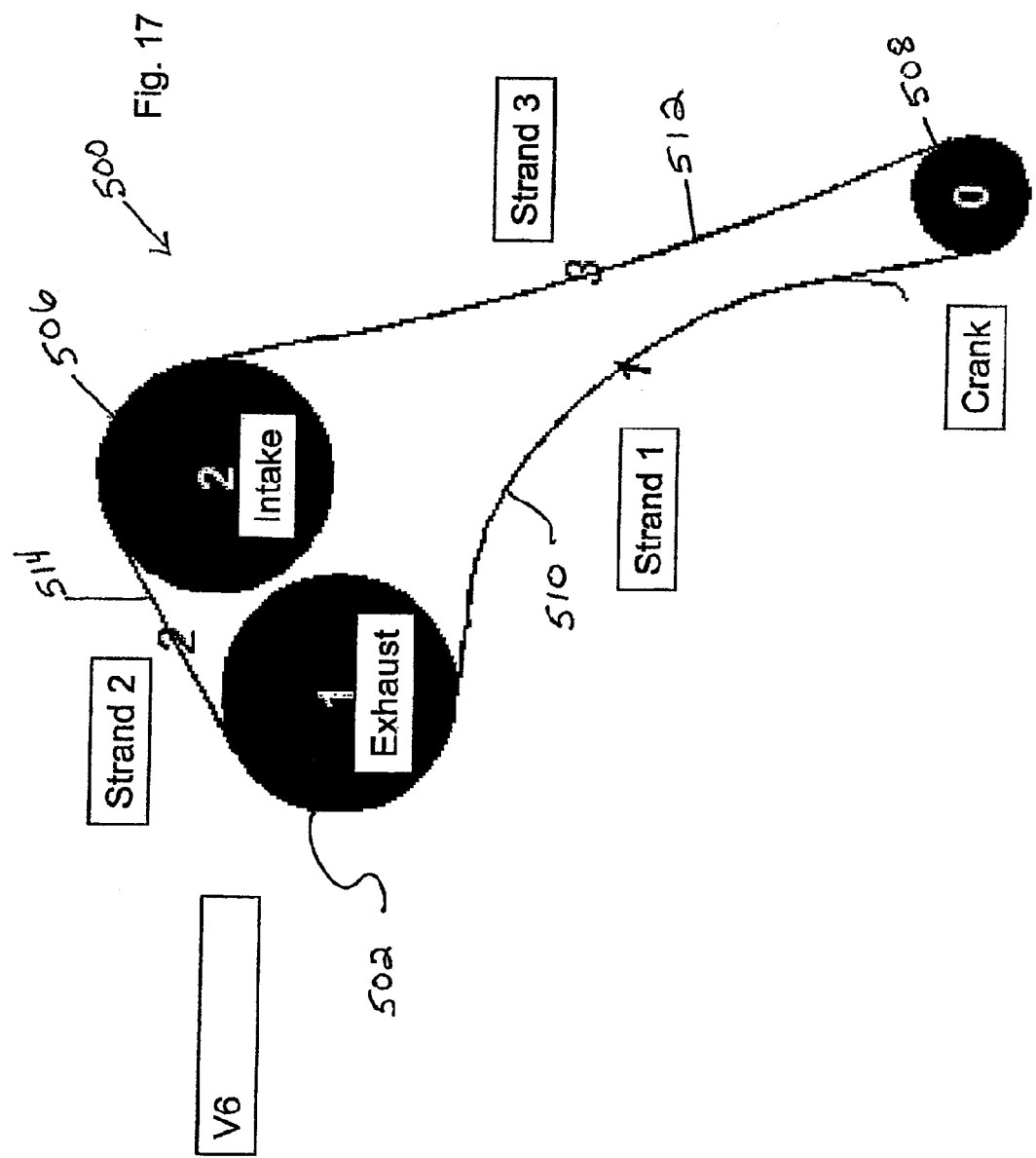

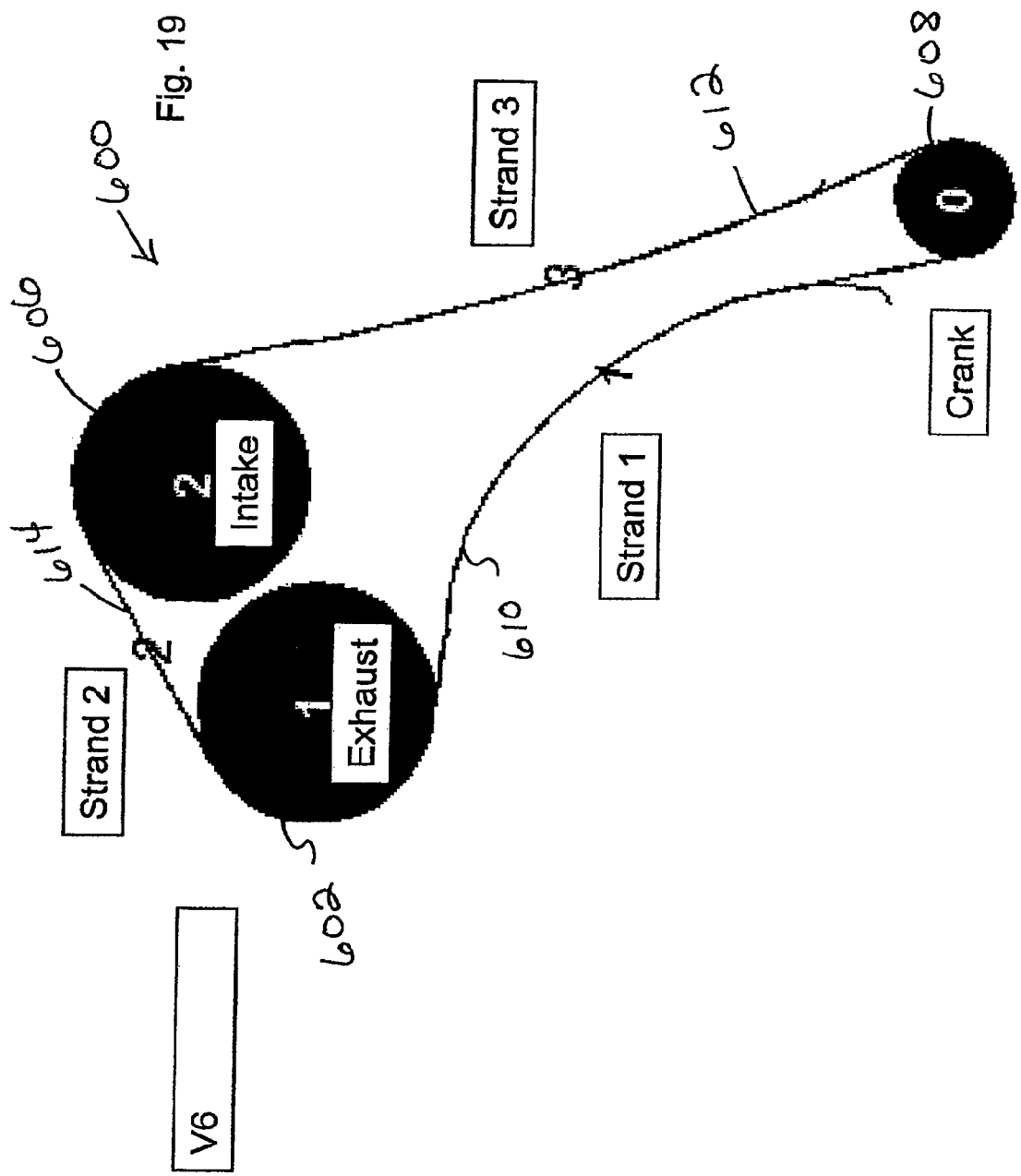

MULTIPLE TENSION REDUCING SPROCKETS IN A CHAIN AND SPROCKET SYSTEM

This application claims the benefit under 35 USC 119 (e) of U.S. provisional patent application Nos. 60/976,399 filed Sep. 28, 2007, and 60/976,977 filed Oct. 2, 2007, which are hereby incorporated herein by reference in their entirety.

FIELD

The invention pertains to the field of pulleys and sprockets. More particularly, the invention pertains to a chain and multiple sprockets for reducing resonance tension.

BACKGROUND AND DESCRIPTION OF RELATED ART

Chain and sprocket systems are often used in automotive engine systems to transmit rotational forces between shafts. For example, a sprocket on a driven shaft may be connected via a chain to a sprocket on an idler shaft. In such a chain and sprocket system, rotation of the driven shaft and driven sprocket will cause the rotation of the idler shaft and idler sprocket via the chain. In an automotive engine system, sprockets on the crankshaft may be used to drive one or more cam shaft sprockets.

The chains used in chain and sprocket systems typically comprise a plurality of link plates connected with pins or rollers or chains with the plurality of link plates having engagement teeth connected with pins and/or links. The sprockets typically comprise a circular plate having a plurality of teeth disposed around the circumference thereof. Located between adjacent teeth are roots having generally arcuate or semi-circular profiles for receiving the pins, rollers, or teeth of the chain. Each root has a root radius which is the distance from the center of the sprocket to a point along the root closest to the center of the sprocket. The sprocket roots and/or teeth are also associated with a pitch radius, which is the distance from the center of the sprocket to a pin axis which is part of a chain joint when the chain is seated on the sprocket.

In a conventional ("straight") sprocket, the root radii are all substantially equal, and the sprocket's pitch radii also are substantially equal. However, it has been found that as a chain rotates around a straight sprocket, audible sound frequencies creating undesirable noise are often generated as the chain teeth, pins or rollers connecting the links of the chain contact the sprocket teeth and impact sprocket engagement surfaces or the roots disposed between adjacent teeth of the sprockets.

Sound frequencies and volume of such noise created by the operation of chain and sprocket systems typically vary depending on the chain and sprocket designs, chain rotational speed, and other sound or noise sources in the operating environment. In the design of chain and sprocket systems, it can be desirable to reduce the noise levels generated as the rollers, pins or teeth of a chain engage a sprocket.

In chain tension measurements, certain chain tensions originating from occurrences outside the chain and/or sprocket in a particular system may vary on a periodic or repeating basis, which often can be correlated to tension inducing events. For example, in automotive timing chain systems, it has been observed from chain tension measurements that the engagement and disengagement of each sprocket tooth or root with the chain often results in repeating tension changes. These chain tension changes may be correlated with potentially tension-inducing events, such as the firing of piston cylinders. Reducing these tensions and forces on chains may be of particular importance if the chains include elements where they do not have the properties of steel, such as ceramic elements as described in U.S. application Ser. No. 10/379,669.

The number of tension events that occur relative to a reference time period, as well as the amount of the tension change for each event may be observed. For example, in an automotive timing chain system, one may observe the number or frequency of tension changes in the chain relative to rotations of a sprocket or a crankshaft, as well as the magnitude of the tension change in the chain. A tensioning event that occurs once per shaft or sprocket rotation is considered a "first" order event, and an event occurring four times for each shaft or sprocket rotation is considered a "fourth" order event. Depending on the system and the relative reference period, i.e., rotations of the crankshaft or the sprocket (or another reference), there may be multiple "orders" of events in a crankshaft or sprocket rotation in such a system that originate from one or more tension sources outside the chain and sprocket. Similarly, a particular order of the sprocket rotation may include or reflect the cumulative effect of more than one tensioning event. As used herein, such orders of tensioning events occurring during a sprocket (or crankshaft) rotation also may be referred to as the orders of the sprocket (or crankshaft) or the sprocket orders (or crankshaft orders).

In straight sprockets, measurable tensions typically are imparted to the chain at a sprocket order corresponding to the number of teeth on the sprocket, also known as the pitch order. Thus, in a sprocket with nineteen teeth, tensions would be imparted to the chain at the nineteenth order, i.e., nineteen times per revolution of the sprocket. This is engagement order. A tension event in a straight sprocket originating from outside the sprocket would typically occur at equal intervals relative to the sprocket rotation, with a generally equal tension change or amplitude.

A "random" sprocket typically has root and/or pitch radii that vary around the sprocket, i.e. it is not a straight sprocket. Random sprockets, in contrast, typically have different tensioning characteristics when compared to straight sprockets due to their differing root or pitch radii. As the chain rotates around the random sprocket, each of the different radii typically imparts a different tensioning event to the chain. For instance, as a roller of a roller chain engages a root having a first root radius, the chain may be imparted with a tension different from when a roller of the chain engages a root having a second root radius larger than the first root radius. Tension changes, in addition, may also be imparted to the chain by a random sprocket due to the relative positioning of the different root radii. A roller moving between adjacent roots having the same root radii may result in different chain tension changes than a roller moving between adjacent roots having different radii.

The change in chain tensions imparted by random sprockets due to the relative positioning of the root and/or pitch radii may be further accentuated when the sprocket has more than two different root or pitch radii. For example, in a random sprocket having first, second, and third successively larger root radii, the tension imparted to the chain may be greater when a chain roller moves from a root having a first root radii to a root having a third root radii than when a chain roller moves from a root having a first root radii to a root having a second root radii.

Random sprockets designed principally for noise reduction often cause increases in chain tensions and tension changes as compared to the maximum tensions imparted to the chain by straight sprockets. For example, a random sprocket design may reduce chain noise or chain whine by reducing the pitch order of the sprocket. However, reducing the pitch order of a sprocket may result in concentrating the tensional forces imparted to the chain by the sprocket over the lower orders of the sprocket. These lower orders can excite a chain drive resonance. This often results in increased chain tensions corresponding to the lower orders of the random sprocket.

Such increased chain tensions at the lower sprocket orders frequently cause the overall maximum chain tension force exerted on the chain and sprocket to increase. As a consequence, a chain and sprocket system subjected to such tensions typically will experience greater wear and increased opportunities for failure, as well as other adverse effects, due to the concentration of the tensional forces in the lower orders.

A recently issued U.S. Pat. No. 7,125,356 to Todd entitled "TENSION-REDUCING RANDOM SPROCKET" describes one approach for reducing chain tensions using repeating root and/or pitch radii patterns. The patent describes patterns or sequences effective to impart tensions to the chain to reduce maximum chain tensions during operation of the system relative to maximum chain tensions of a system. The disclosure of U.S. Pat. No. 7,125,356 to Todd is incorporated herein as if completely rewritten into this disclosure.

Generally speaking, when chain tensions reach a maximum or "spike" in a chain and sprocket system in an engine, a resonance condition has been reached and this resonance condition or mode typically corresponds to a given system oscillation frequency. As can be seen from U.S. Pat. No. 7,123,356, tension reducing sprockets providing tension reducing pitch radii or root radii patterns around the sprocket may be utilized to reduce such maximum tensions at resonance conditions.

In some systems, there may be more than one resonance mode, and a corresponding tension "spike", though a range of system oscillation frequencies. Such multiple resonance conditions or modes may occur where there are multiple tensioning events from outside the chain and sprocket system interacting at one or more system frequencies; there are multiple chains and sprockets forming the system; or there are other excitations imposed on the system that results in multiple resonance modes. The presence of multiple resonance modes may complicate efforts to reduce overall chain tensions. For example, such a system having more than one driven sprocket may have a first resonance mode and a second resonance mode. A tension reducing sprocket designed and placed into the system, with a straight sprocket, to reduce tensions in the second resonance mode may increase chain tensions at the first resonance mode. Further, a similar result may occur if a second tension reducing sprocket is placed into the system to reduce the second (or other) resonance mode tensions.

While not intending to be bound by any theory, a chain and sprocket system may reach a resonance mode, with a tension spike, at relatively low frequency system oscillations. The chain and sprocket system may reach another (or more than one) resonance mode at higher system oscillation frequencies. The number of resonance modes and their corresponding system frequencies will depend on the nature and configuration of the systems, such as the chain stiffness, the number and types of sprockets used in the system, the sprocket and chain configuration, the nature and frequency of the external excitations imposed on the system, etc.

Again, without intending to be bound by theory, the system oscillations at the lower resonance modes tend to be in the same direction. At higher oscillation frequencies, part of the system will tend to oscillate in an opposite direction of another part of the system resulting in a second or other resonance mode. In some drive systems, the resonance mode at relatively high system oscillation frequencies does not contribute enough tension to the overall maximum chain tension to make it a concern for chain durability. In other drive systems, such as high inertia systems, the chain tensions at the resonance mode at such higher system oscillation frequencies can be significant. Further reducing tensions at the resonance mode at such higher oscillation frequency or higher resonance mode tensions can lead to improved drive efficiency, especially if a tension reducing sprocket has already been applied to reduce maximum tensions at first mode.

SUMMARY

In the sprocket systems described herein, two or more tension reducing sprockets are oriented relative to each other and are provided with root or pitch radii patterns that cooperatively reduce, and in some instances cancel, maximum chain tensions in chain and sprocket systems having two or more resonance modes. In one aspect, the at least two tension reducing sprockets provide root or pitch sequences and are oriented to reduce maximum chain tensions in one resonance mode relative to the tensions at such mode using a straight sprocket in such system, without significantly increasing the effect of tension excitations from sources outside of the chain and sprocket system at other resonance modes. In another aspect, the tension reduction sprockets are oriented with each other so that tensions will be reduced at a second (or higher) resonance mode relative to the tensions at such mode using a straight sprocket(s), without significantly increasing the maximum chain tensions at a first resonance mode by more than 20%, preferably not more than 10% and most preferably not more than about 0%. Hence, two or more tension reducing sprockets may be used to reduce tensions at one resonance mode from sources outside the chain and sprocket system while minimizing tension increases at another (or multiple) resonance mode(s).

In yet another aspect, the tension reductions may be obtained with two tension reducing sprockets which are driven sprockets (as opposed to a driving sprocket), such as, one tension reducing sprocket on each of two separate cam shafts. Such dual tension reducing sprocket designs used in combination with a drive sprocket should be sized to generate similar levels of chain tension and should be oriented so that the tensions they generate substantially cancel each other at a first resonance mode of the drive. The tension contributions from the two tension reducing sprockets then add at a second resonance mode to generate tensions that offset, or substantially reduce, the second mode tensions, without increasing the first resonance mode tensions. In this aspect, the chain tensions do not increase at the first resonance mode by more than about 20%, preferably not more than about 10% and most preferably not more than about 0%. In still another aspect, certain relative orientations of the tension reducing sprockets provide tension reductions in the second mode without more than a 20% increase in tension in the first mode when compared to the tension at those modes where the sprockets are at other relative orientations. In yet another aspect, a third tension reducing sprocket can be inserted into the system to reduce tensions in the system to reduce tensions at the first resonance mode.

As will be more fully described below, for the chain and sprocket systems described herein, two tension reducing sprockets, for example one on each cam shaft, may be used to cancel first mode tensions. A second mode root and/or pitch radii pattern may be combined with a first mode pattern on one sprocket, but tensions arising from first resonance mode tensions are not increased more than about 0% to about 20% as described above in both roller and silent chain systems. Further, more than one repeating root and/or pitch radii pattern for multiple orders for tension reduction can be included on one sprocket.

BRIEF DESCRIPTION OF THE DRAWINGS

FIG. 7 shows a chain and sprocket system with two third order tension reducing sprockets.

FIG. 13 shows a seven sprocket system for a V 8 engine driving both banks of sprockets.

FIGS. 13a, 13b, and 13c illustrate the tensions on chain strands 1, 2, and 3, respectively, of the seven sprocket system shown in FIG. 13 at the first and second resonance mode when all of the sprockets shown in the sprocket system of FIG. 13 are straight sprockets.

FIG. 15a shows the chain tensions where each of the sprockets is straight and external excitations are applied to the system (in this instance crank torsionals, as well fluctuating valve train/cam torque loads). FIG. 15b is a chain tension plot for the system shown in FIG. 7d with the two third order tension reducing driven sprockets.

FIG. 17 shows a system with a driving sprocket, and two driven sprockets, which may use all straight sprockets or a tension reducing sprocket as a driven sprocket and a tension reducing sprocket as a driving sprocket.

FIG. 18b, shows plots for the maximum chain tensions using the tension reducing sprocket as a driven sprocket and a driving sprocket. In each Figure, one plot shows the minimum and maximum chain tensions by strand and the other plot shows the strand 3 tension content by engine cycle order number (and by crank order).

FIG. 19 shows a system with a driving sprocket, and two driven sprockets subject to external excitations. The system may use all straight sprockets, or it may use a tension reducing driven sprocket and a tension reducing driving sprocket provided with dual order pitch pattern with the rotation of the sprocket.

FIG. 20a shows the chain tensions where each of the sprockets is straight and external excitations are applied to the system (in this instance crank torsionals, as well fluctuating valve train/cam torque loads). FIG. 20b, shows the maximum chain tensions using the tension reducing sprocket as a driven sprocket and a tension reducing driving sprocket with a dual order pitch pattern. FIGS. 20c and 20d show tension plots for the system shown in FIG. 19 with the above mentioned straight sprockets compared with the system using the above mentioned single order tension reducing driven sprocket and above mentioned dual order driving sprocket. FIGS. 20c and 20d, the external excitations are modified from those used in FIGS. 20a and 20b. In each Figure, one plot shows the minimum and maximum chain tensions by strand and the other plot shows the strand 3 tension content by engine cycle order number (and by crank order).

DETAILED DESCRIPTION

Figure 1A:
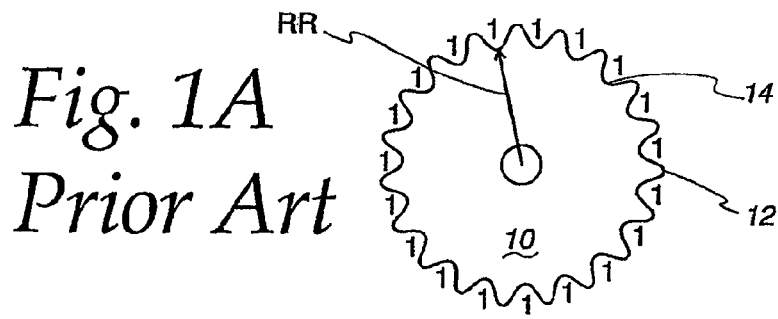
FIG. 1A shows a side elevation view illustrating a straight sprocket according to the prior art.

A random sprocket may be used in an automotive chain and sprocket system, such as used in an engine timing system. The chain and random sprocket are coupled to an internal combustion engine which operates the chain and sprocket at variable speeds. In a simple chain and sprocket system with one resonance mode, the sprocket has a repeating pattern of root or pitch radii which are coupled to a chain at a wrap angle where the wrap angle of the chain with the sprocket and pattern are effective to reduce tensions imparted to the chain. The chain wrap angle, sprocket order and root or pitch radii pattern are selected to reduce tensions on the chain, especially at resonance, and to reduce noise generated as the chain contacts the sprocket.

In one aspect, the multiple sprocket systems described herein have at least one drive sprocket, at least two driven sprockets. At least two of the sprockets are tension reducing sprockets, which may be used in various combinations. For example, the drive sprocket may be a tension reducing sprocket used in combination with one or more of the driven sprockets. In other examples, the driven sprockets may be tension reducing sprockets and the drive and other sprockets may be straight sprockets.

In this aspect, the at least two tension reducing sprockets have a pattern of root radii or pitch radii, or sequence of pitch or root radii which emulates a repeating pattern of root or pitch radii, which reduces overall tensions in the chain when there is at least one recurring tensioning event originating outside the sprockets over a 360° revolution of the at least two tension reducing sprockets. The sprocket order, chain wrap angle and the pattern of pitch radii or root radii of the at least two tension reducing sprockets are coordinated to be effective to reduce maximum chain tensions during operation of the at least two tension reducing sprockets when operated with a chain system relative to where the sprockets are straight sprockets operated with the chain system. A Fourier series which creates a curve representative of pitch or root radii versus sprocket position of (1) the emulating sequence of the pitch or root radii or (2) the sequence of the variation from mean pitch radii or mean root radii, provides an amplitude of the order which is consistent with a sprocket of the same order that has a repeating pattern of pitch or root radii which is effective for overall tension reduction in the chain at resonance conditions. Further the wrap angle of the chain also has an effect as to whether the pattern or sequence will be effective in reducing tension.

In another aspect of the multiple sprocket systems described herein, the systems have at least one drive sprocket, at least two driven tension reducing sprockets and at least two resonance modes. The at least two tension reducing sprockets have a pattern of root radii or pitch radii, or sequence of pitch or root radii which emulates the repeating pattern of root or pitch radii, which reduces overall tensions in the chain when there is at least one recurring tensioning event originating outside the sprockets over a 360° revolution of the at least two tension reducing sprockets. The sprocket order, chain wrap angle and the pattern of pitch radii or root radii of the at least two tension reducing sprockets are coordinated to be effective to reduce maximum chain tensions during operation of the at least two tension reducing sprockets when operated with a chain system at second resonance mode conditions relative to where the sprockets are straight sprockets operated with a chain system operating at second mode resonance conditions. A Fourier series which creates a curve representative of pitch or root radii versus sprocket position of (1) the emulating sequence of the pitch or root radii or (2) the sequence of the variation from mean pitch radii or mean root radii, provides an amplitude of the order which is consistent with a sprocket of the same order that has a repeating pattern of pitch or root radii which is effective for overall tension reduction in the chain at resonance conditions. Further the wrap angle of the chain also has an effect as to whether the pattern or sequence will be effective in reducing tension.

To provide a tension reducing sprocket which is used in the multiple sprocket systems described herein, the order of the sprocket and the wrap angle of the chain are selected such that the resonance tension of the chain and sprocket assembly is minimized at resonance conditions. It has been found, however, that certain average chain wrap angles should not be used with a sprocket and chain that is designed to provide a least one pattern of varying root or pitch radii which repeat at least twice. At the wrap angles described herein, the repeating patterns of root or pitch radii and timing of the tensions provided by the root or pitch radii are particularly effective to reduce maximum chain tensions during operation of the tension reducing sprocket when operated with a chain system at resonance conditions relative to where the sprocket is a straight sprocket operated with a chain system at resonance conditions. Average wrap angles outside the average wrap angles defined by the equation set forth below should be avoided to best reduce maximum chain tensions:

average wrap=360*N*/Order±120/Order where: N=1, 2, . . . , ORDER−1 and ORDER=sprocket order as a result of tensioning events which originate outside the chain and/or sprocket.

Average wrap angle is the average of angles about the sprocket center from where the chain first contacts the sprocket to where the chain last contacts the sprocket. It is the average difference of the angular distance between the chain engagement angle and disengagement angle. Wrap angles change each time a sprocket is engaged or disengaged; hence, average angle is used herein.

As mentioned above, in one aspect, the multiple sprocket systems described herein have at least one drive sprocket, and at least two driven sprockets, where at least two of the sprockets are tension reducing sprockets. In this aspect of the multiple tension reducing sprocket systems described herein, the at least two tension reducing sprockets are oriented relative to each other in a way which is effective for reducing tensions from the tension sources outside the chain and sprocket system relative to the maximum chain tensions for the system using straight sprockets.

In another aspect, the multiple tension reducing sprocket systems described herein, there are at least three sprockets, two are driven tension reducing sprockets and one is drive sprocket. In the multiple tension reducing sprocket systems described herein, the at least two driven tension reducing sprockets are oriented relative to each other in a way which is effective for reducing tensions from the tension sources outside the chain and sprocket system at the second resonance mode associated with the tension reducing sprockets while not increasing chain tensions more than about 0 to about 20% at the first resonance mode associated with the system.

The orientation between the sprockets may be readily maintained with a mounting coupling (or orientation structure) disposed to maintain the sprocket in a predetermined orientation with respect to the other sprocket(s) being made a part of the sprocket. This mounting coupling (or orientation structure) can be a key and slot, a known hole pattern for mounting each sprocket, a set screw or bolt system, a permanent fixation approach (e.g. welding or casting) to a shaft or other sprocket or other sprocket orientation approaches as are known.

While not bound by theory and not a limitation on the invention, it is believed that for an engine to have a second resonance mode for an engine chain drive, there must be at least two driven sprockets and one drive sprocket. As noted above, and again while not intending to by bound by theory or as a limitation on the invention, it is believed that at the first resonance mode, the two driven sprockets oscillate in unison. They will oscillate in the same direction at the same time resulting in fluctuations in angular speed. When a tension reduction sprocket is applied to address and reduce first resonance mode tensions, the tension reduction sprocket can be the driven or drive sprocket or it could be a combination of two tension reduction sprockets. These sprockets are oriented so that the tensions add with the maximum radius at the center of the chain wrap (at the center of the chain as measured from where the chain first engages the sprocket and where the chain leaves the sprocket). To cancel tensions generated from outside the chain and sprocket system at first resonance mode, the sprockets have to be oriented, but they must be rotated together when they are re-oriented so that the relative angle between them will remain the same.

For tension reduction at second mode in the multiple tension reducing sprocket system, the maximum of the sprocket radius is at the center of the chain wrap in a first sprocket and the minimum of the sprocket radius for one tension reducing sprocket is at the center of the chain wrap for the second tension reducing sprocket. Thereafter, the tension reducing sprockets are reoriented to reduce the tensions generated from outside of the chain and sprocket system at the second resonance mode, but still keeping tensions at the first resonance mode from increasing not more than 0 to 20%. The tension reducing sprockets used in the multiple tension reducing chain and sprocket systems using silent and or roller chains, now will be described in more detail and compared to known random and straight sprockets. Generally, a first resonance mode occurs at the above mentioned lower system oscillation frequencies, and a second, third, etc. resonance mode occurs at the above mentioned higher system oscillation frequencies. However, such references to "first" and "second" resonance modes are not intended as a limitation on the relevant resonance modes, and, where appropriate, refer to resonance conditions occurring at different system oscillation frequencies.

FIG. 1A illustrates a typical prior art sprocket 10. The sprocket 10 has nineteen radially extending teeth 12 disposed about its generally circular circumference for engaging links of a chain, such as the links 82 of chain 80 illustrated in FIG. 3. Straight sprockets, such sprocket 10, may have a variety of sizes, and, for example, may have an outer radius of approximately 3.0915 cm, as measured from the center of the sprocket 10 to tips of the teeth 12.

When reference herein is made to resonance and overall reduction of tension on a chain at resonance, torsional resonance is generally being referred to. In torsional resonance, the chain strands act as springs and the sprockets and shafts act as interias or masses. A simple chain drive with one driven sprocket and two chain strands has one torsional mode and acts like a rotational version of a simple spring mass system. It has a resonance frequency that amplifies the response (including shaft angular velocity and tension variation) to forces external to the sprocket. This torsional resonance can be excited by periodic torque fluctuations (such as cam torques) applied to the driven shaft at the same frequency as the resonance frequency. Resonance also can be excited by angular velocity variation at a driving (such as a crank) shaft or by internal tension fluctuations caused by engagement of the chain with the sprocket or variation in chain and sprocket shape.

In most chain drives this first torsional resonance occurs between 100 and 400 Hz. This is too low to be excited by engagement, but can easily be excited by the lower orders introduced by a random sprocket. Chain drives also can have transverse and longitudinal resonances. In a transverse resonance a chain strand vibrates like a guitar string. These can be excited by tension variations or movement at the end of the strands. While reducing chain tension variation can reduce transverse resonance activity, pitch radius variation can excite transverse resonance activity. In longitudinal resonance, the chain strands act as springs and the sprocket acts as a translating (as opposed to a rotating) mass. Typical chain drives do not have significant longitudinal resonance activity which will deleteriously affect the chain and sprocket. Most important in engine chain and sprocket drives is torsional resonance in the drive.

Sprocket root radii 14 are defined between adjacent teeth 12 for receiving pins or rollers 84 that connect the links 82 of the chain 80. The roots 14 have a generally arcuate profile to facilitate engagement with the pins 84 of the chain. Each root 14 has a root radius R (see FIG. 3 or RR in FIG. 1A), defined as the distance from the center of the sprocket 10 to a point along the root 14 closest to the sprocket center. In the illustrated sprocket 10 of FIG. 1A, the root radius RR is approximately 2.57685 cm, as measured from the center of the sprocket 10 to the innermost point along the root 14. The sprocket 10 of FIG. 1A has all of its root radii RR equal to each other, and is generally known as a "straight" sprocket. Thus, the depths of each root 12 are the same, as indicated with reference numeral 1, corresponding to the first (and only) root radius RR for this type of sprocket 10.

Different tensioning events on a chain (not shown for sprocket 10) may be repeated on a periodic basis during each rotation of the sprocket. As mentioned above, the number of times a given tensioning event resulting from forces external to the sprocket is repeated in one rotation of the sprocket may be referred to as an "order" relative to the sprocket rotation. For example, a tensioning event of the chain that occurs once during each rotation of the sprocket may be termed a first order event, events occurring twice during one sprocket revolution may be termed second order events, etc.

When the tension in the chain 80 is observed during operation of the system, increases in the tension of the chain 80 may occur at certain orders of the sprocket 10 revolution. In a straight sprocket, such as the sprocket 10 of FIG. 1A, the only significant peak in the chain tension may occur at the order of the sprocket 10 corresponding to the number of teeth 12 on the sprocket 10, also known as the pitch order as mentioned above.

Thus, a chain rotating about the sprocket 10, having nineteen teeth 12, will have a peak in the tension imparted to the chain by the sprocket at the nineteenth order of the sprocket revolution, or nineteen times for every revolution of the sprocket 10. Peaks in the tension imparted to a chain by a sprocket 10 may also be due to other factors besides the number of sprocket teeth 12. For example, a sprocket 10 that is not rotating about its exact center may impart a tension to the chain at the first sprocket order, or once for every rotation of the sprocket, due to the eccentric rotation of the sprocket.

As mentioned above, in order to reduce noise generated by contact between the chain, and roots 14 and teeth 12 of a sprocket 10, "random" sprockets have been developed with plurality of different root radii. For example, a random sprocket may have two different root radii arranged in a predetermined pattern selected to decrease noise. A random sprocket may also be designed to incorporate three different root radii arranged in a predetermined pattern to further reduce noise generated by engagement of the chain 80 with the sprocket. The root radii may vary based on the particular system and sprocket design.

Figure 1B:
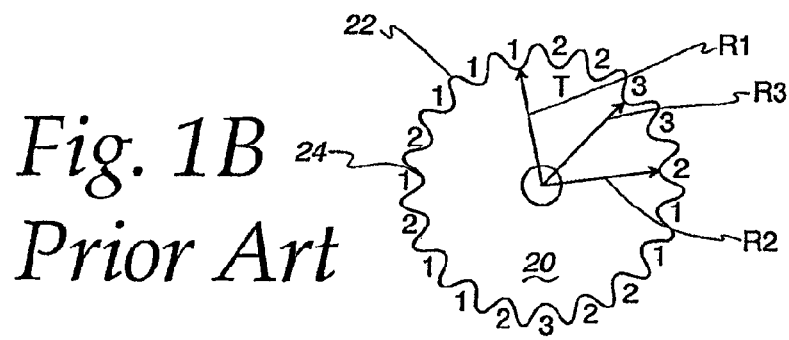
FIG. 1B is a side elevation view illustrating a random sprocket according to the prior art.

The random sprocket 20 illustrated in FIG. 1B is designed to reduce noise generated by engagement of a chain (not shown for sprocket 20) with the sprocket 20. The random sprocket 20 is similar to the straight sprocket 10 of FIG. 1A, but has three different root radii R1, R2, and R3 and thus three different root depths 1-3. In the sprocket 20 illustrated in FIG. 1B, the first root radii R1 is approximately 2.54685 cm, the second root radii R2 is approximately 2.57685 cm, and the third root radii R3 is approximately 2.60685 cm, as measured from the center of the sprocket 20 to the innermost points of the roots 24.

The root depths 1-3 are arranged in a pattern selected to modulate the engagement frequency between pins of a chain and roots 24 between adjacent teeth 22 of the sprocket 20 in order to reduce noise generation. As the pins of the chain move between adjacent roots 24 of the sprocket 22, the radial position at which the pins seat varies between a maximum radius, a nominal radius, and a minimum radius. In the noise reducing sprocket 20 of FIG. 1B, the pattern of root 24 depths, beginning at the timing mark T, is 2, 2, 3, 3, 2, 1, 1, 2, 2, 3, 2, 1, 1, 2, 1, 2, 1, 1, 1

In the random sprocket 20 of FIG. 1B having three or more different root radii arranged in a pattern selected for noise reduction, the first, second, third, and fourth sprocket orders may impart relatively large tensions to the chain as compared to the remaining sprocket orders, especially when amplified by resonance. This increase in chain tensions corresponding to lower sprocket orders may have the undesirable effect of increasing the overall maximum chain tensions and reducing the overall life of the chain and/or sprockets.

Coordinating chain wrap angles, sprocket order and root radii or pitch radii patterns or sequences as described herein, provide reduced chain tensions with random sprockets. A plurality of different root or pitch radii are used with the wrap angles described herein. The radii are arranged in one or more patterns that are effective to permit reduction of chain tensions occurring at one or more selected sprocket orders by virtue of the external forces on the sprocket which are translated to the chain. The root or pitch radii patterns or sequences also may be selected to reduce chain noise or whine without the disadvantages of prior art random sprockets.

The sprocket pitch radii or root radii to be used as described herein are selected relative to a maximum radius and a minimum root radius as determined from the chain link size and configuration; the chain connecting pin size and spacing; and/or the number of sprocket teeth, tooth configuration and sprockets size. The root radii also may be selected relative to a nominal root or pitch radius which typically is the mid-point between the maximum and minimum radii.

The selection of varying root radii or varying pitch radii allows for the overall reduction of the pitch tensions generated by the chain to sprocket tooth/root contact. It is believed that this is due to the contact of the chain pins (or equivalent chain elements) with the sprocket teeth/roots at different times and at different tension levels as a result of the varying depths of the sprocket roots.

Figure 1C:
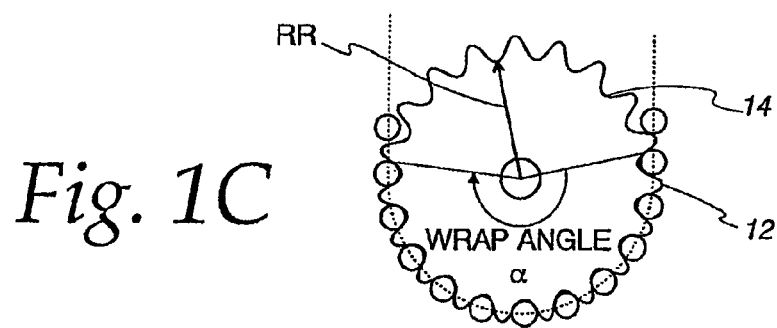
FIG. 1C illustrates a wrap angle where the chain first contacts and last contacts the sprocket.
Figure 6:
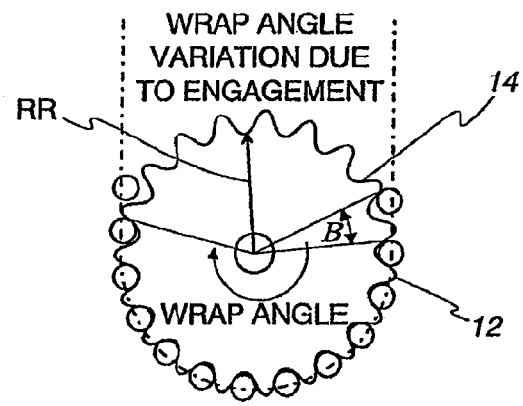
FIG. 6 illustrates wrap angle variation and how a wrap angle can vary as a result of the chain first engaging the sprocket differently from FIG. 1C when the chain leaves the sprocket.

FIG. 1C illustrates a wrap angle around a sprocket and shows where the chain first contacts and last contacts the sprocket which contact points define the wrap angle α. Comparison of the wrap angles shown in FIG. 1C and FIG. 6 shows how chain wrap angles may vary, such as an angle generally shown as β in FIG. 6, due to how the chain engages the sprocket. As noted above, this is the reason why average wrap angle is used as described herein.

In one aspect, the root radii or pitch radii are arranged in a pattern that repeats at least twice, but the repetition may be multiple times around the outer sprocket circumference. This circumference has a generally round circumferential profile defined by the outer edges of the sprocket teeth. The pattern of root or pitch radii typically includes one or more sets or multiple, non-uniform or random root or pitch radii. Each set of radii typically includes the same number of root or pitch radii having the same length and arranged in the same order. In one aspect, the pattern may repeat where the pitch radii or root radii are arranged in ascending and descending order, e.g. 1, 2, 3, 4, 4, 3, 2, 1, 1, 2, 3, 4, 4, 3, 2, 1. Hence, in this aspect the pattern may ascend from a minimum pitch radius and then descend from the maximum pitch radius to a minimum pitch radius. Further, beneficial results may be obtained where one pitch or root radius in one pattern is missing. When the phrase "substantially repeats" is used, this means one root or pitch radius may be missing from a repeating pattern of root or pitch radii. In other aspects, when there is a number of repeating patterns, and more than one pattern may be missing, a radius coordinating the chain wrap angle, order and pattern can provide chain tension reduction over a straight sprocket, especially at resonance. Further, different sets of root radii may have radii of different lengths, number and arrangement.

The use of such patterns or otherwise random root radii repeated as sequences which emulate patterns as described above along the circumference of the sprocket permits the cancellation or reduction of tensions to specific sprocket orders (or other orders based on the applicable reference). In doing so, the cumulative effect of canceling the tension forces permits the planned overall reduction of chain tension incorporated to the system by the sprocket at specific sprocket orders (or other reference orders).

The selection of the patterns of non-uniform or random root or pitch radii, and the lengths of the root radii further permit the use of major and minor patterns or sub-patterns of radii. Such major and minor patterns are effective to reduce the overall tensions imparted to the chain (and overall system) to multiple sprocket orders (or other applicable orders) and at different magnitudes. This along with the selection of chain wrap angles at given orders provides the additional flexibility in the selection of the sprocket root radii and patterns to offset multiple tension sources in the system and/or to balance the overall tensions on the chain and sprocket regardless of other sources of the tensional forces.

Figure 2:
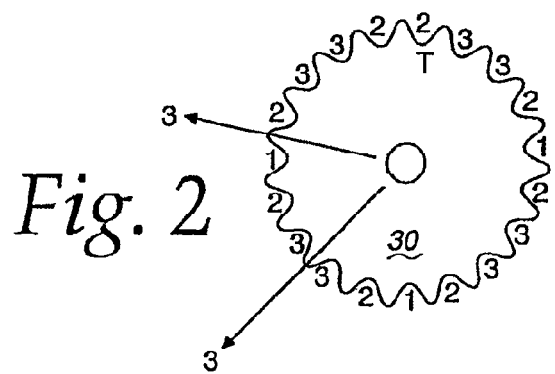
FIG. 2 shows a sprocket substantially of the fourth order.

FIG. 2 illustrates a sprocket 30 according to an aspect of the invention wherein a random sprocket 30 is provided for both reducing chain tensions at a predetermined sprocket orders and reducing noise generated by engagement of the chain 80 with the sprocket 30. Similar to the straight sprocket 10 of FIG. 1A and the random sprocket 20 designed principally for noise reduction of FIG. 1B, the sprocket 30 has a plurality of radially extending teeth 32 (FIG. 3) disposed about its generally circular outer circumference for engaging the pins 84 of the chain 80. Roots 34 are defined between adjacent teeth 32 for receiving the pins 84 that connect the links 82 of the chain 80.

Figure 3:
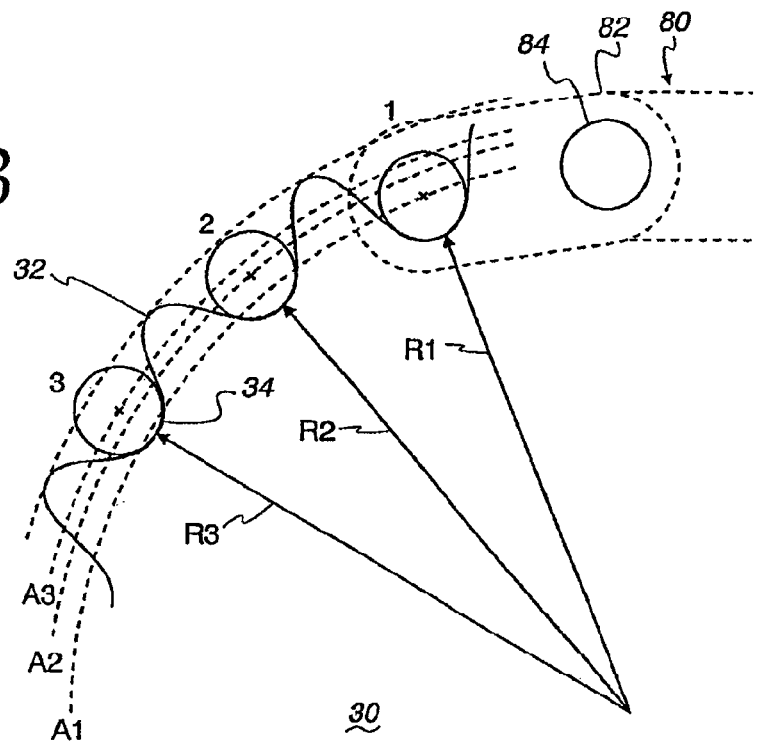
FIG. 3 is a side elevation view illustrating a random sprocket.

As seen in FIG. 3, the tension reducing sprocket 2 of FIG. 3 has a maximum root radius R3, a nominal root radius R2, and a minimum root radius R1. As mentioned above, the maximum and minimum root radii are typically dependent on the link size and pin spacing, the shape of the sprocket teeth, etc. The root pattern of the sprocket 30 of FIGS. 2 and 3 is different from the root pattern of the sprocket 20 of FIG. 1B.

FIG. 2 illustrates a sprocket with root radii R1, R2, and R3 of approximately 2.54685 cm, 2.57685 cm, and approximately 2.60685 cm, respectively. The pattern of root depths, beginning at the timing mark T, is 2, 3, 3, 2, 1, 2, 3, 3, 2, 1, 2, 3, 3, 2, 1, 2, 3, 3, 2. The root radii pattern of the sprocket 30 contains a pattern, i.e., 2, 3, 3, 2, 1, that is substantially repeated (one root missing, the last providing a less than full pattern) four times around the circumference of the sprocket 30.

Using chain wrap angles at the orders as described herein and the use of a random pattern of root or pitch radii grouped in sets of patterns of root or pitch radii such as seen herein in the discussion of tension reducing sprockets, provide a repeating pattern which may be used to effectively concentrate and cancel the lower order tensions of the chain 80 at the fourth order of the sprocket 30. In a simple system with one resonance mode, this reduces the overall maximum tensions imparted to the chain 80 by the sprocket 30 and external forces imposed on the sprocket which create the chain tension. These chain tensions may be imparted to the chain 80 by various parts of the automotive engine system external to the sprockets, such as the shaft and/or the pistons.

These external sources may impart tension events to the chain 80 in addition to those imparted to the chain 80 by the sprockets 20 and 30 of the above examples. These external tensioning events may occur at intervals that correspond to orders of the sprocket revolution. Use of a combination of specific orders with chain wrap angles, random root radii and repeating root radii patterns all go to cancel tensions imparted to the chain 80 by the sprocket 30 and reduce the overall maximum chain tensions relative to a straight sprocket and also reduces chain noise or whine, especially at resonance conditions with engines (such as internal combustion engines) which operate at variable speeds.

The arrangement of the root radii or pitch radii for tension reducing sprockets may be selected by substantially repeating the radii pattern a number of times equal to the sprocket order at which it is desired to concentrate the chain tensions to reduce overall tension. To reduce maximum tensions due to a second order tensioning event, generally one would expect a pattern will be a second order pattern which will repeat twice to reduce overall tensions. In another example, to concentrate the tensions imparted to the chain 80 by the sprocket 30 of the invention at the fourth or more sprocket order, the arrangement of the root radii may comprise a pattern that substantially repeats four or more times around the sprocket 30.

Figure 4:
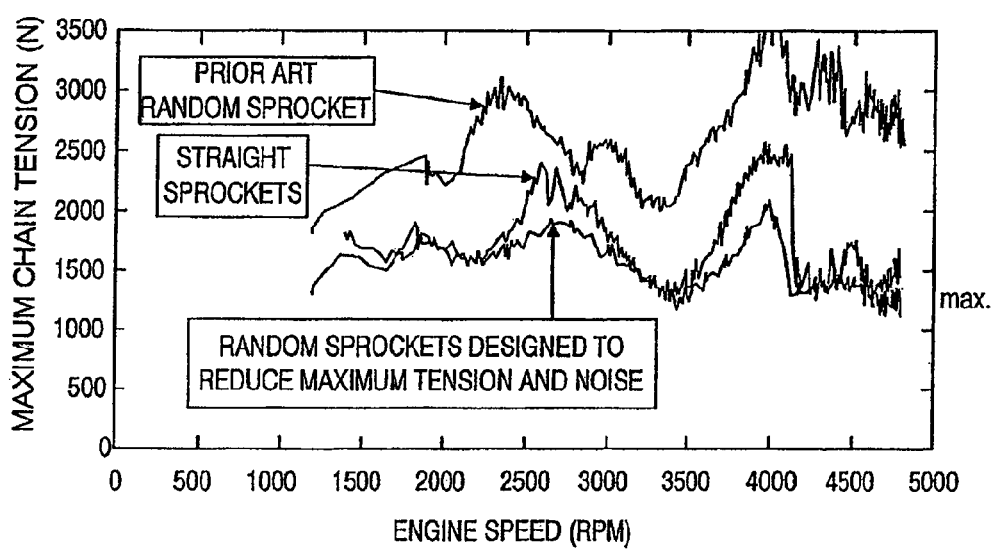
FIG. 4 is a graph comparing the maximum chain tensions of the sprockets of FIGS. 1-3 with the speed of an engine.

As mentioned above, the repeating radii pattern and chain wrap angles can provide the benefit of reducing the overall maximum tensions imparted to the chain 80 by the sprocket 30, while also reducing noise generated by contact between the sprocket 30 and the chain 80. In connection with an internal combustion piston engine, the expected overall maximum tension reducing effects of the random sprocket 30 of the invention are illustrated in FIG. 4. The maximum tensions expected to be imparted to a chain by the sprockets 10, 20, and 30 of FIGS. 1-3 are compared with corresponding internal combustion engine speeds in FIG. 4, especially when speeds are at resonance condition such as at around 4000 rpm.

As illustrated in FIG. 4, the straight sprocket 10 of FIG. 1 imparts significantly lower maximum tensions to the chain 80 throughout the various engine speeds, but especially at resonance condition, relative to a random sprocket 20 designed only for noise reduction. In particular, it is expected that the maximum tensions imparted to the chain 80 by the random sprocket 20, designed principally for noise reduction, are higher near engine speeds of 4000 rpm, while the straight sprocket 10 would impart much lower maximum tensions to the chain for the same engine speed.

The maximum tensions imparted to the chain 80 by the random sprocket 30 designed for both noise reduction and reduced maximum chain tensions are expected to be significantly lower than for the random sprocket 20 designed principally to reduce noise. In fact, the tension reducing sprocket 30 may impart comparable, and in some instances, lower maximum tensions to the chain 80 than the straight sprocket 10 at engine speeds reflected in FIG. 4. Thus, FIG. 4 illustrates that the improved random sprocket design 30 of the invention is expected to provide for reduction of maximum overall chain tensions, an effect that is not available with prior random sprocket designs.

Although the fourth order was selected for illustration in FIGS. 2 and 3, chain tensions may also be concentrated at other orders of the sprocket revolution as described in the table below. For example, a root or pitch radii pattern may be selected that is effective to concentrate chain tensions at the third order of the sprocket revolution. Such a pattern may include a root radii pattern that is substantially repeated three times around the circumference of the sprocket with a chain wrap angle as described above. For example, a root depth pattern for concentrating chain tensions at the third sprocket order may be 1, 2, 3, 3, 2, 1, 2, 3, 3, 2, 1, 2, 3, 3, 2, 1, where a root depth pattern, i.e., 1, 2, 3, 3, 2, is substantially repeated three times for each revolution of the sprocket.

The tensions imparted to the chain 80 by the sprocket also may be concentrated at more than one sprocket order. For example, a root or pitch radii pattern may be selected that has a major root radii pattern repeating twice for each revolution of the sprocket and a minor pattern that repeats twice within each major pattern. Thus in this aspect, the major and minor radii are provided by having the minor pattern repeating within the major repeating pattern. A benefit of having both major and minor repeating patterns at a selected order and with an appropriate chain wrap angle is the ability to further redistribute the sprocket orders and reduce tensions imparted to the chain 80 by the sprocket. Thus, for every revolution of a sprocket having such a pattern, the major radii pattern is effective to impart two tensioning events, while the minor radii pattern is effective to impart four tensioning events. The tensioning events imparted by the minor radii pattern may be of a lesser magnitude than the tensioning events imparted by the major radii pattern.

In order to reduce overall chain tensions in a simple chain and sprocket system where one resonance mode is of concern, the tensions imparted to the chain 80 by the wrap angles and random and repeating root or pitch radii patterns, such as those of sprocket 30, are selected to at least partially offset tensions imposed on the chain 80 by such sources external to the sprocket 30 and chain 80. In one aspect, the orders of the sprocket revolution corresponding to peaks in the chain tension due to external sources, as well as those due to the sprocket 30, are determined. The sprocket 30 is then configured to cancel chain tensions at a sprocket order at which the chain tensions due to external sources are at a maximum. This provides the potential to reduce the overall tensions in the chain 80, such as may occur if both the chain tension due to the sprocket 30 and the chain tension due to external sources are at their maximums due to resonance. For example, when the external tensions occur four times for every rotation of the sprocket 30, the root radii of the sprocket 30 may be arranged using the wrap angles described herein to concentrate the maximum tensions imparted to the chain 80 by the sprocket 30 at sprocket orders phased to at least partially cancel the external tensions imparted to the chain at resonance. In this manner, the external tensions in the chain 80 may be at least partially offset by the sprocket tensions in the chain 80 to reduce the overall tension in the chain 80 and increase the life cycle of both the chain 80 and the sprocket 30.

Figure 5:
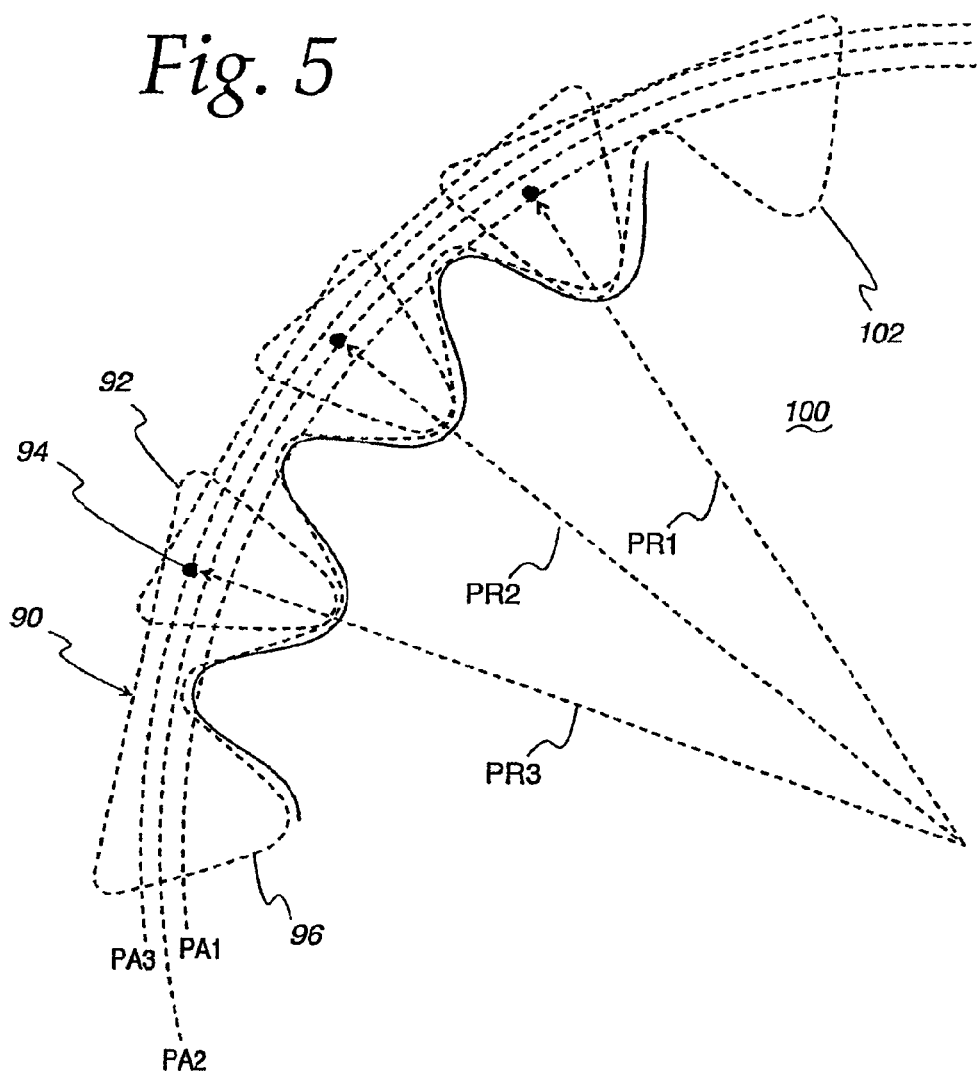
FIG. 5 is a detail view of a sprocket showing the teeth of a silent chain between adjacent sprocket teeth.

FIG. 5 illustrates a tension reducing sprocket 100 for use with a silent chain 90 which has chain teeth which engage the sprocket. Silent chains have teeth which are in a driving (or driven) engagement the sprocket teeth, such as at the side or flanks of the teeth of the sprocket, and also generally have outer link plates which do not drivingly engage the sprocket, but may aid in alignment of the chains into the sprocket. The silent chain 90 comprises a plurality of link plates 92, each having one or more teeth 96, pivotable relative to each other about joints 94. As the silent chain 90 rotates around the sprocket 100, the teeth 96 of the chain 90 engage teeth 102 of the sprocket 100. The sprocket 100 has three different pitch radii PR1, PR2, and PR3, as measured from the center of the sprocket 100 to joints 94 between link plates 92 having teeth 96 seated between teeth 102 of the sprocket 100. FIG. 5 illustrates arcs PA1, PA2, and PA3 through the centers of chain joints 94 that correspond to the pitch radii R1, R2 and R3. The pitch radii PR1, PR2, and PR3 are arranged in a pattern effective to distribute tensions imparted to the chain 90 by the sprocket 100 at one or more predetermined orders of the revolution of the sprocket 100.

The radii patterns or sequences which emulate the repeating patterns should be coordinated with chain wrap angles. By way of example for sprockets which have 2, 3 or up to 8 orders, wrap angles are determined by applying equation (1) set forth above. In this illustration, Table I below sets forth wrap angles which should be used for each of 2 up to 8 orders.

TABLE I

| | Wrap Angles Which Should Be Used | | | | | | |
|---|---|---|---|---|---|---|---|
| N | 2d Order | 3rd Order | 4th Order | 5th Order | 6th Order | 7th Order | 8th Order |
| 1 | 180° ± 60° | 120° ± 40° | 90° ± 30° | 72° ± 24° | 60° ± 20° | 51.4° ± 17.1° | 45° ± 15° |
| 2 | | 240° ± 40° | 180° ± 30° | 144° ± 24° | 120° ± 20° | 102.8° ± 17.1° | 90° ± 15° |
| 3 | | | 270° ± 30° | 216° ± 24° | 180° ± 20° | 154.3° ± 17.1° | 135° ± 15° |
| 4 | | | | 288° ± 24° | 240° ± 20° | 205.7° ± 17.1° | 180° ± 15° |
| 5 | | | | | 300° ± 20° | 257.1° ± 17.1° | 225° ± 15° |
| 6 | | | | | | 308.6° ± 17.1° | 270° ± 15° |
| 7 | | | | | | | 315° ± 15° |

These wrap angles set forth above in the table are used so that the sprocket or pulley radial variation generates sufficient tension variation at the drive resonance to cancel the tensions generated by external sources. Wrap angles outside these values result in insufficient tension generation due to radial variation. Set forth below in Table II are wrap angles which should be avoided where N and Order are set forth in the equation 1 above.

TABLE II

Wrap Angles to Avoid

| N | 2d Order | 3rd Order | 4th Order | 5th Order | 6th Order | 7th Order | 8th Order |
|---|---|---|---|---|---|---|---|
| 0 | 90° ± 30° | 60° ± 20° | 45° ± 15° | 36° ± 12° | 30° ± 10° | 55.7° ± 8.6° | 22.5° ± 7.5° |
| 1 | 270° ± 30° | 180° ± 20° | 135° ± 15° | 100° ± 12° | 90° ± 10° | 77.1° ± 8.6° | 67.5° ± 7.5° |
| 2 |  | 300° ± 20° | 225° ± 15° | 164° ± 12° | 150° ± 10° | 128.6° ± 8.6° | 112.5° ± 7.5° |
| 3 |  |  | 315° ± 15° | 228° ± 12° | 210° ± 10° | 180° ± 8.6° | 157.5° ± 7.5° |
| 4 |  |  |  | 292° ± 12° | 270° ± 10° | 231.4° ± 8.6° | 202.5° ± 7.5° |
| 5 |  |  |  |  | 330° ± 10° | 282.9° ± 8.6° | 247.5° ± 7.5° |
| 6 |  |  |  |  |  | 334.3° ± 8.6° | 292.5° ± 7.5° |
| 7 |  |  |  |  |  |  | 337.5° ± 7.5° |

A sprocket pattern order in a tension reducing sprocket may be selected based on measured or predicted chain tensions. In one procedure, pin locations may be generated for a seated chain around the sprocket with the correct number of teeth, pitch length, and radial amplitude. The pin locations are positioned to achieve the correct pitch radius variation amplitude while maintaining a constant pitch length and a chain wrap angle as defined by equation (1) above. Then dynamic system simulations are run with the sprocket without external excitations. Strand tensions from the tension reducing sprocket are compared to strand tensions from a simulation of straight sprocket and external excitations. The tension reduction sprocket orientation is adjusted so that the sprocket's tensions will be out of phase with external tensions. A dynamic system simulation with the tension reduction sprocket and external excitations is run. Adjustments to the tension reduction sprocket orientation and amplitude are made if necessary. Simulations at a range of conditions are run to make sure the sprocket is always effective. A CAD based program, or similar software, is used to convert pin locations to the actual sprocket profile. Then prototype sprockets are made and tested on engines to confirm performance. After the tension reducing sprockets have been designed as described herein, they are made a part of a multiple tension reducing sprocket systems as described below.

EXAMPLE 1

How Sprocket Orientation Affects the Performance of Two Tension Reducing Sprockets on First Mode FIG. 7 shows a system 200 with two third order tension reducing sprockets 202 and 204 (one on each cam shaft) to cancel a first mode resonance. There are no externally imposed tensions. Two other sprockets in the system include sprocket 206 and drive sprocket 208. A chain having strand 210 runs between the exhaust tension reducing sprocket 202 and drive sprocket 208. Chain strand 212, or strand 4, runs between drive sprocket 208 and sprocket 206. Strand 214, or strand 3, runs between sprocket 206 and tension reducing sprocket 204 Strand 216, or strand 2 runs between tension reducing sprocket 204 (representing intake) and tension reducing sprocket 202.

The initial orientation shown in FIG. 7 has a maximum radius located at the center of the chain wrap as seen at 218 and 220 for both sprockets. The exhaust sprocket 202 was rotated to vary the relative sprocket orientation. Maximization of first mode tensions generated by the tension reducing sprockets is the most effective way to cancel first mode tensions generated from outside the chain and sprocket system. The root 1 angle described in FIGS. 7, 7 b, 7 d, 7 f, and 7 h is the angle (rotating counter clockwise) from horizontal to a maximum sprocket radius when the engine is at top dead center firing for cylinder number 1 (typically the cylinder closest to the front of the engine).

Figure 7B:
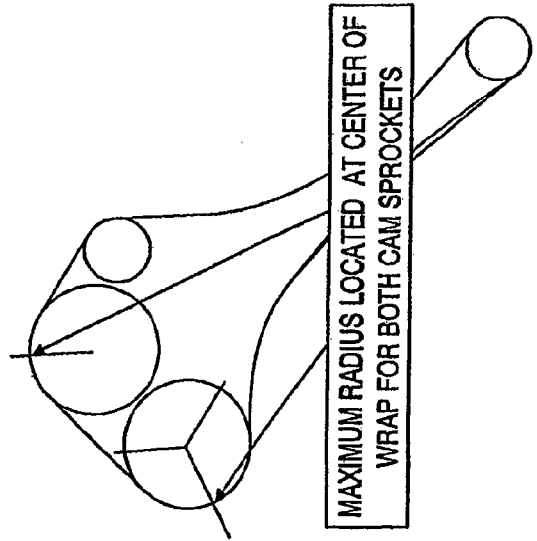
FIG. 7b illustrates a chain wrapped around the maximum radii at center of the chain wrap.
Figure 7A:
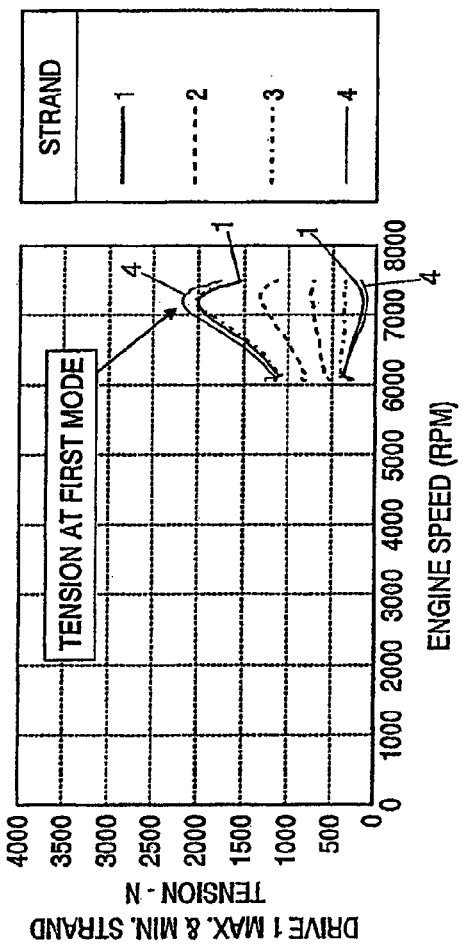
FIG. 7a is a plot for engine speed in rpm versus strand tension and is a baseline plot for the tension reducing sprockets in FIG. 7.

FIG. 7a shows a plot for engine speed in rpm versus strand tension in Newtons. FIG. 7a illustrates a baseline plot for the tension reducing sprockets 202 and 204 having the chain wrapped around at their maximum radii at the same time, as illustrated at 218 and 220 in FIG. 7b. As will be shown by comparison of FIG. 7a with FIGS. 7c, 7e, and 7g, the maximum tension generation happens when the tension reducing sprockets are both oriented with a maximum radius point close to the center of the chain wrap as it wraps around the sprocket. Hence for the system of this example, the optimal condition actually appears to be when the maximum radii are both within the middle of the chain wrap at the same time. Because both sprockets are being accelerated in the same rotation direction at the same time, they generate tensions that alternate between strands 1 and 4. This is the best relative orientation for canceling first mode tensions caused by external sources. It should be noted that in FIG. 7 and other figures showing two curves for a single chain strand, one curve is maximum tensions on the strand and the other minimum tensions on the same strand over the varying engine speeds.

Figure 7D:
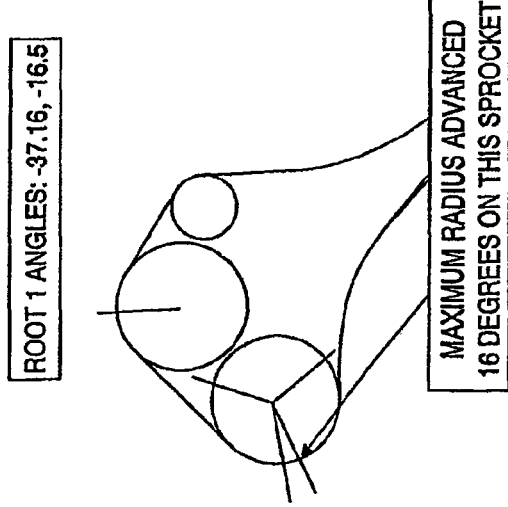
FIG. 7d shows the maximum radius of the tension reducing sprocket advanced 16 degrees.
Figure 7C:
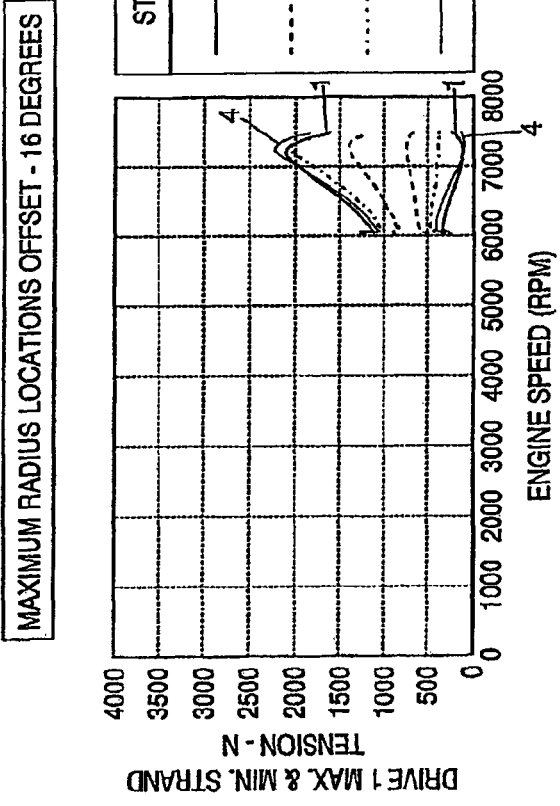
FIG. 7c illustrates tension plots when the maximum radius of the tension reducing sprocket is advanced 16 degrees as shown in FIG. 7d.
Figure 7F:
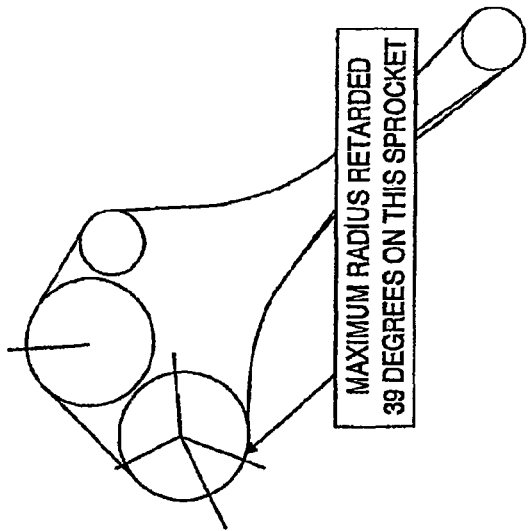
FIG. 7f illustrates the maximum radius of the tension reducing sprocket retarded 39 degrees.
Figure 7E:
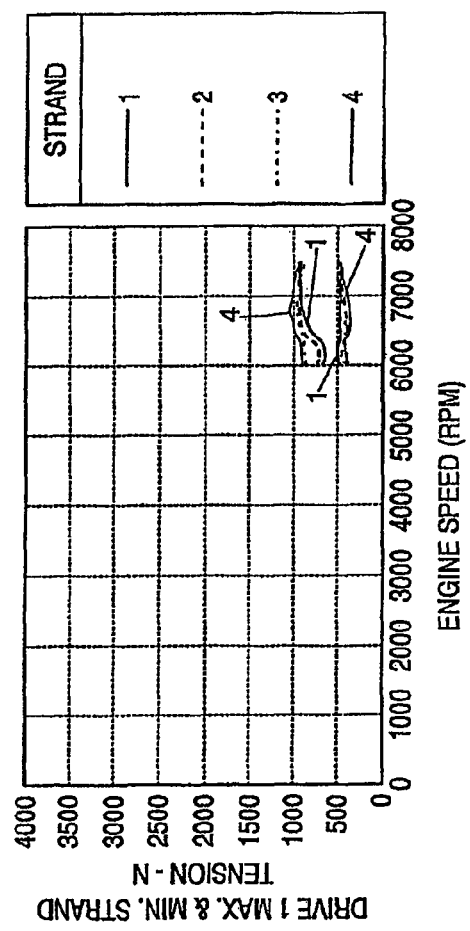
FIG. 7e illustrates tension plots when the maximum radius of the tension reducing sprocket is retarded 39 degrees as shown in FIG. 7f.
Figure 7H:
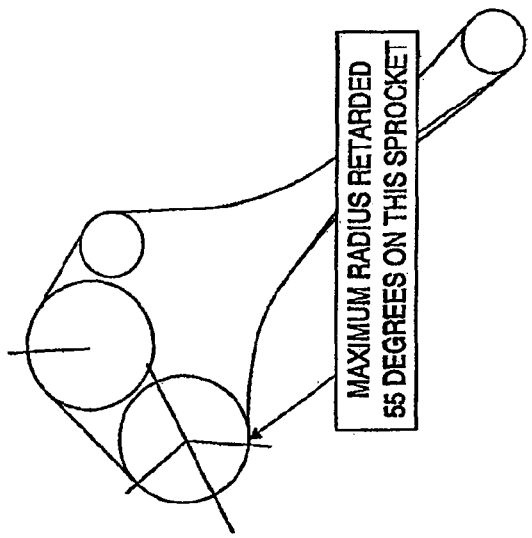
FIG. 7h illustrates the maximum radius of the tension reducing sprocket retarded 55 degrees.
Figure 7G:
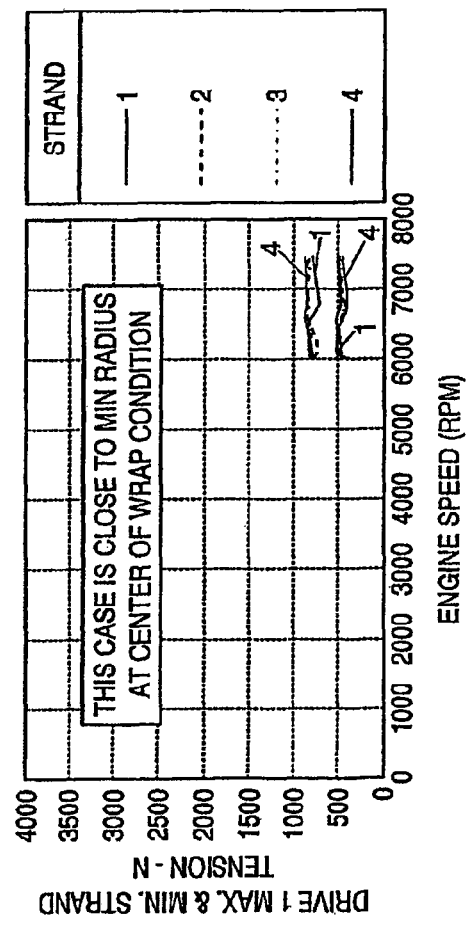
FIG. 7g illustrates what happens to chain tensions when the maximum radius of the tension reducing sprocket is retarded 55 degrees as shown in FIG. 7h.

As generally seen by trends illustrated in FIGS. 7c, 7e, and 7g, when the tension reducing sprockets are oriented so one has a maximum radius at the center of the chain wrap and the other has a minimum radius at the center of the chain wrap, the tensions generated by the two tension reducing sprockets 202 and 204 cancel each other at the first mode resonance condition. Because the sprockets are being accelerated in opposite rotation directions, they generate strand tensions that increase and decrease together. As a result, this relative orientation will have very little effect on first mode tension caused by external sources. Since tensions in strands increase and decrease together at second mode, however, this orientation will be best for canceling second mode tensions caused by external sources (or a first mode tension reducing sprocket). FIG. 7c shows what happens to chain tensions when the maximum radius of tension reducing sprocket 202 is moved −16 degrees as shown in FIG. 7d. FIG. 7e shows what happens to chain tensions when the maximum radius of tension reducing sprocket is retarded 39 degrees as shown in FIG. 7f. Finally FIG. 7g shows what happens to chain tensions when the maximum radius of tension reducing sprocket is retarded 55 degrees as shown in FIG. 7h.

EXAMPLE 2

A System which has a Large Second Mode Resonance at High Speed

Figure 8:
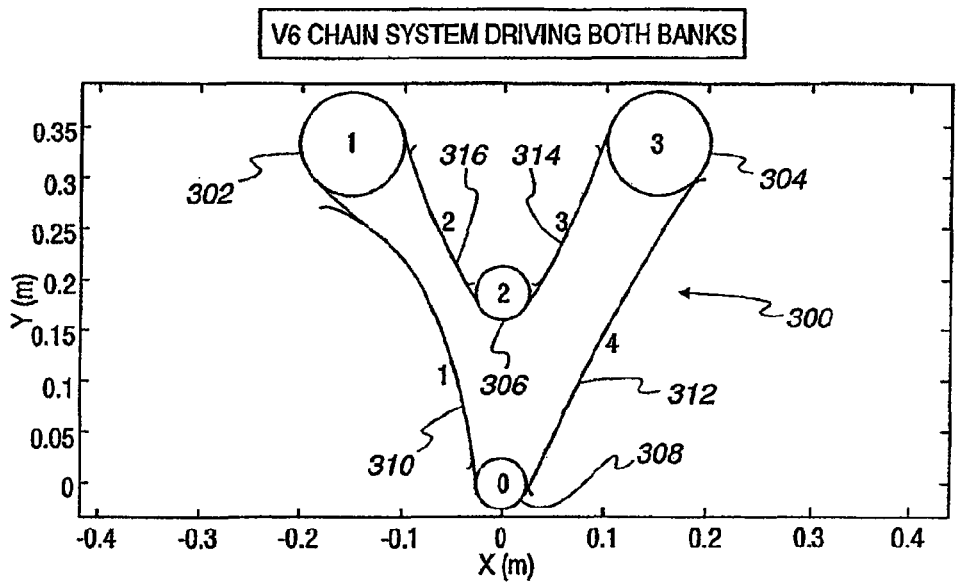
FIG. 8 illustrates a four sprocket system with two tension reducing sprockets.
Figure 8A:
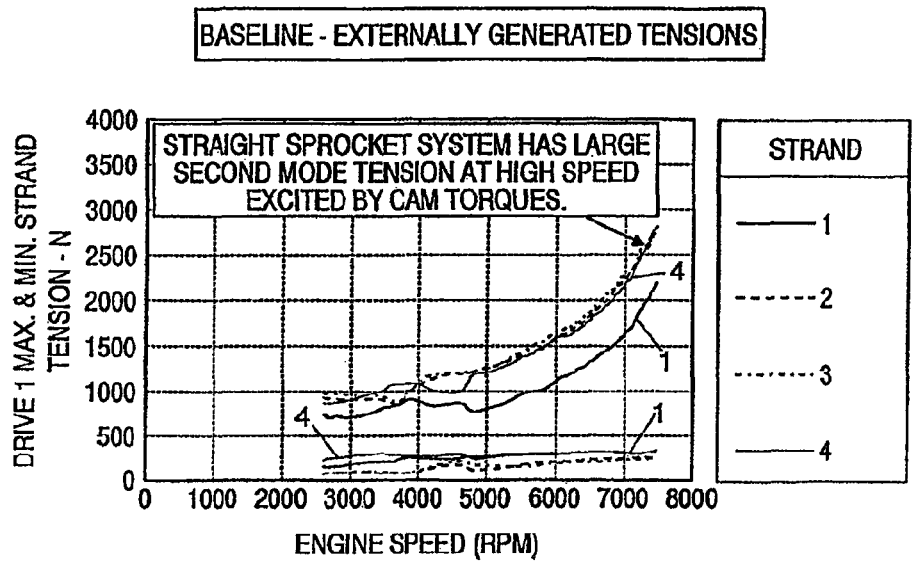
FIG. 8a illustrates tensions in the four sprocket system of FIG. 8 if all of the sprockets of FIG. 8 were straight sprockets.
Figure 8B:
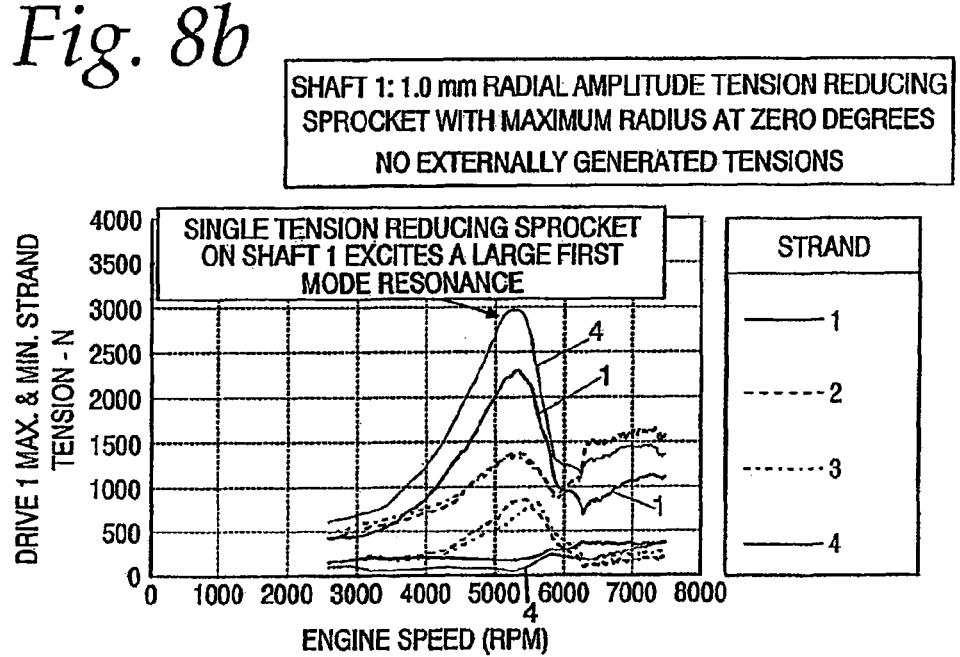
FIG. 8b illustrates tensions in the four sprocket system of FIG. 8 if the sprocket system of FIG. 8 had a single tension reducing sprocket on shaft 1 shown in FIG. 8.
Figure 8C:
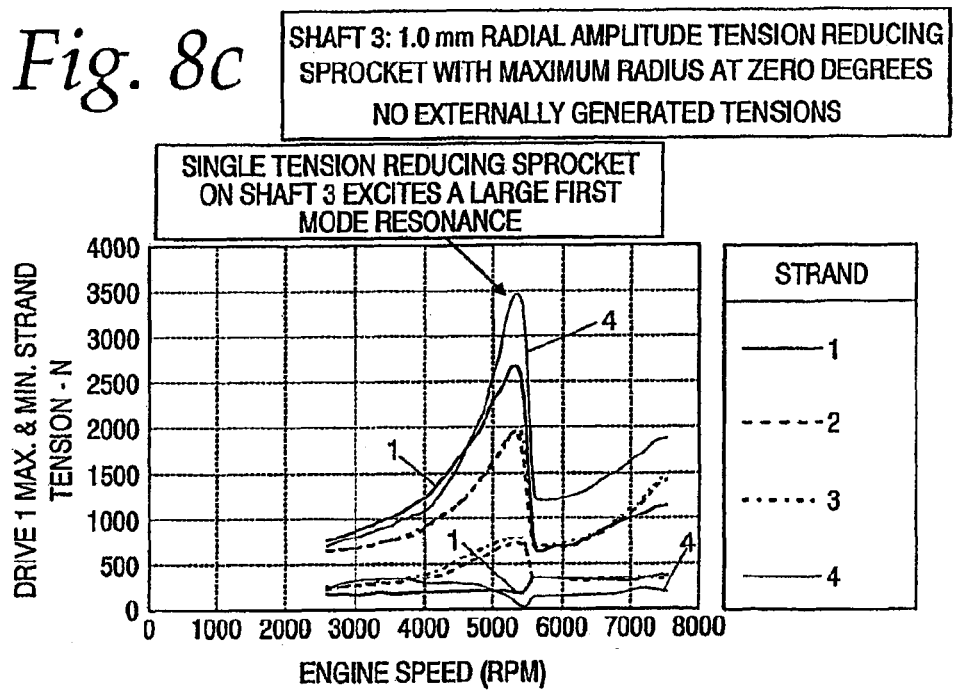
FIG. 8c illustrates tensions in the four sprocket system of FIG. 8 if the sprocket system of FIG. 8 had a single tension reducing sprocket on shaft 3 shown in FIG. 8.

FIG. 8 illustrates a four sprocket system 300 having two tension reducing sprockets 302 and 304 being driven by drive sprocket 308 with sprocket 306 between the two tension reducing sprockets 302 and 304 on shafts 1 and 3, respectively. Chain strand 310, or strand 1, runs between tension reducing sprocket 302 and drive sprocket 308 on shaft 0. Chain strand 312 runs between drive sprocket 308 and tension reducing sprocket 304. Strand 314, or strand 3, runs between tension reducing sprocket 304 and sprocket 306 on shaft 2 and strand 316, or strand 2, runs between sprocket 306 and tension reducing sprocket 302. FIG. 8a illustrates the tensions generated in the system 300 of FIG. 8 if all of the sprockets were straight sprockets. FIG. 8A shows that if in the system shown in FIG. 8 all of the sprockets were straight sprockets, such a straight sprocket system having externally generated tensions, there are large second mode tensions at resonance. FIG. 8b illustrates that if the system shown in FIG. 8 has a single tension reducing sprocket at shaft 1 (sprocket 302) with a 1.0 mm radial amplitude with a maximum radius at zero degrees and no externally generated tensions, there are large first mode resonance tensions. FIG. 8c illustrates that if the system shown in FIG. 8 has a single tension reducing sprocket with a 1.0 mm radial amplitude with a maximum radius at 0 degrees and no externally generated tensions at shaft 3 (sprocket 304), there are large first mode resonance tensions.

It also can be seen that the tensions generated on shaft 3 (sprocket 304) are larger than the tensions by the shaft 1 (sprocket 302) by about 15% at the first mode resonance. It is desired to have these two amplitudes close. To do this, the radial variation amplitude on shaft 1 (sprocket 302) needs to be 15% larger than on shaft 3 (sprocket 304) radial variation amplitude.

Figure 9A:
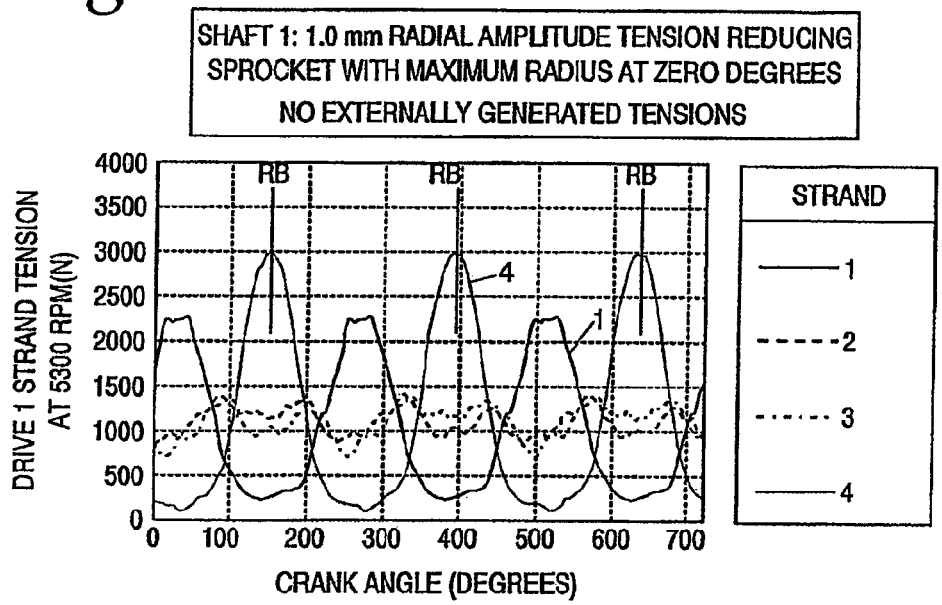
FIG. 9a shows the variation of tensions on a tension reducing sprocket with a 1.0 mm radial amplitude and maximum radius at zero degrees on shaft 1 of FIG. 8 with no externally generated tensions.
Figure 9B:
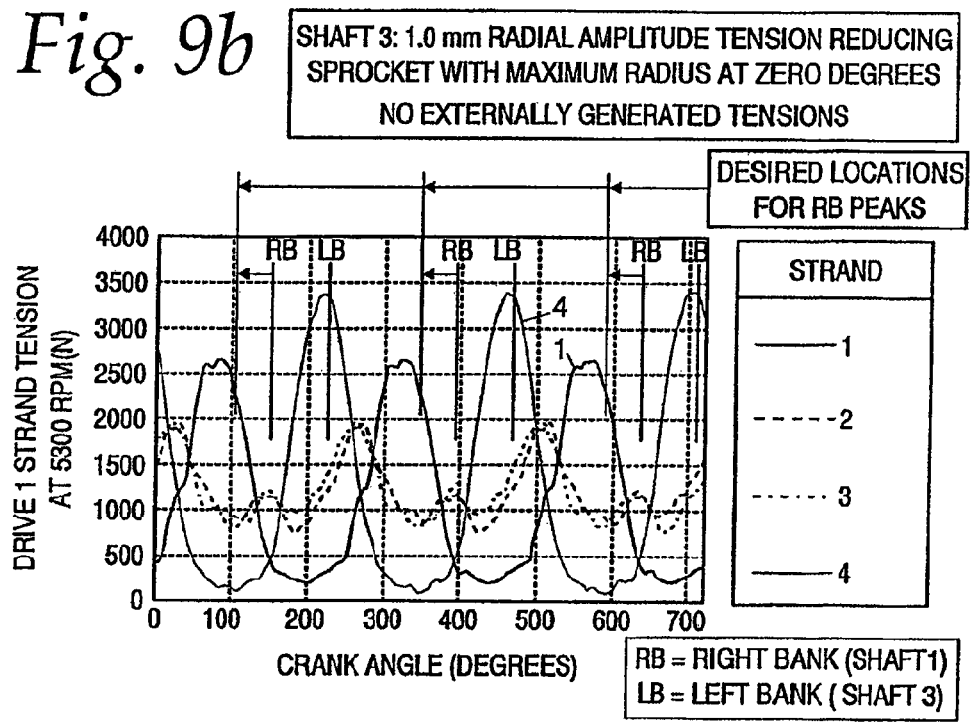
FIG. 9b shows the variation of tensions on a tension reducing sprocket with a 1.0 mm radial amplitude and maximum radius at zero degrees on shaft 3 of FIG. 8 with no externally generated tensions.

At first mode resonance, it is desired that strand 312 (strand 4) tension peaks with the right bank (RB) tension reducing sprocket (sprocket 302) to occur half way between the 312 strand peaks (strand 4) with the left bank (LB) tension reducing sprocket (304). To achieve this, the orientation of the right bank tension reducing sprocket 302 is advanced about 40 crank degrees (20 cam degrees). This advancement is shown in FIGS. 9a and 9b. FIG. 9a shows the variation of tensions with the tension reducing sprocket with a 1.0 mm radial amplitude on shaft 1 (sprocket 302) with no externally generated tensions with the maximum radius at zero degrees. FIG. 9b shows the variation of tensions with the tension reducing sprocket with a 1.0 mm radial amplitude on shaft 3 (sprocket 304) with no externally generated tensions with the maximum radius at zero degrees as well as the desired locations for the right bank (RB) peaks.

Figure 10:
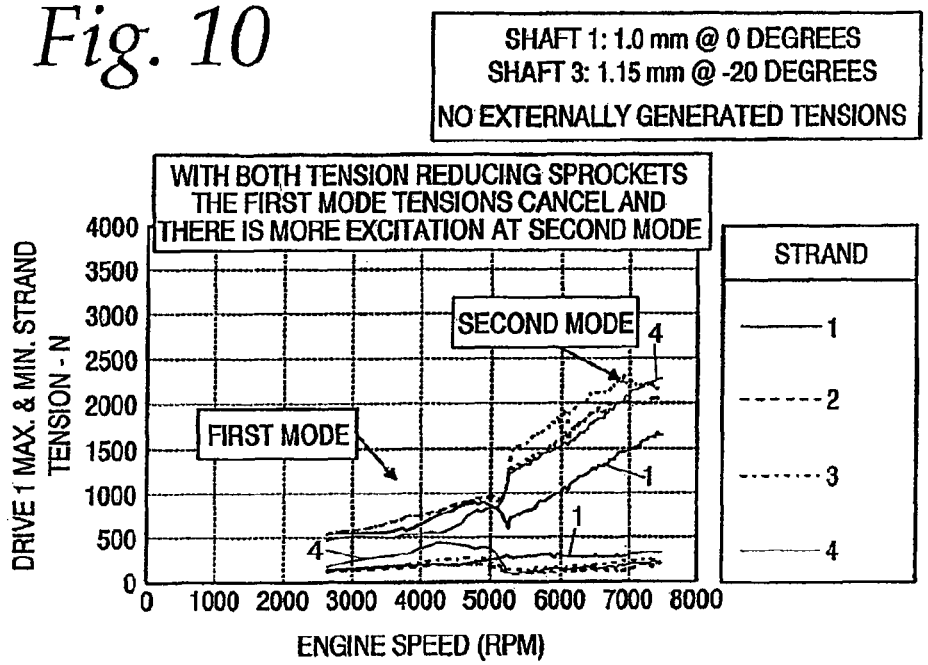
FIG. 10 shows the variation in tensions at varying engine speeds for a 1.0 mm tension reducing sprocket on shaft 1 of FIG. 8 at 0 degrees and with a 1.15 mm tension reducing sprocket on shaft 3 at −20 degrees with no externally generated tensions.
Figure 10A:
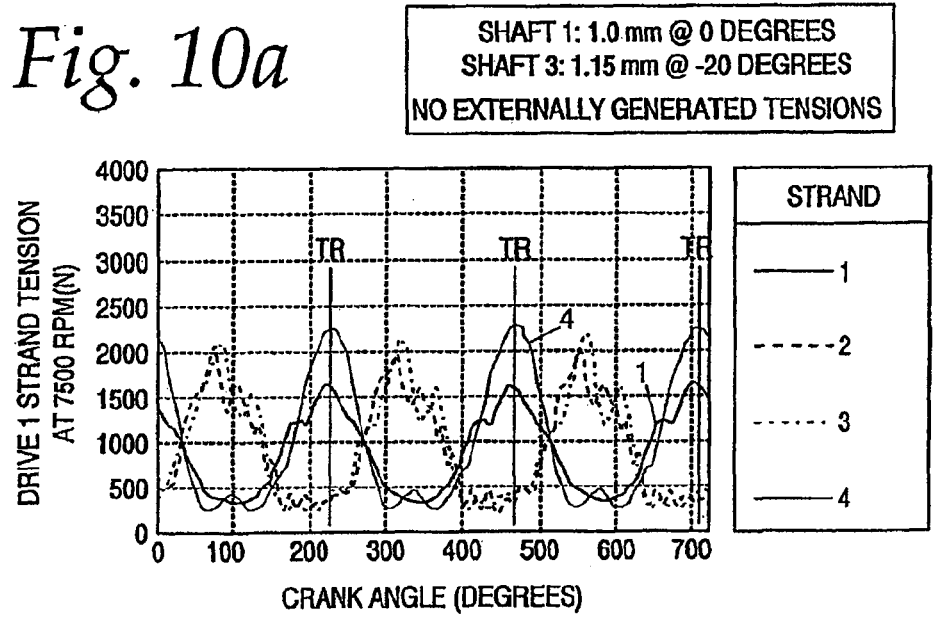
FIG. 10a shows the variation in tensions on individual chain strands as a function of crank angle for a 1.0 mm tension reducing sprocket on shaft 1 of FIG. 8 at 0 degrees and with a 1.15 mm tension reducing sprocket on shaft 3 at −20 degrees with no externally generated tensions.
Figure 10B:
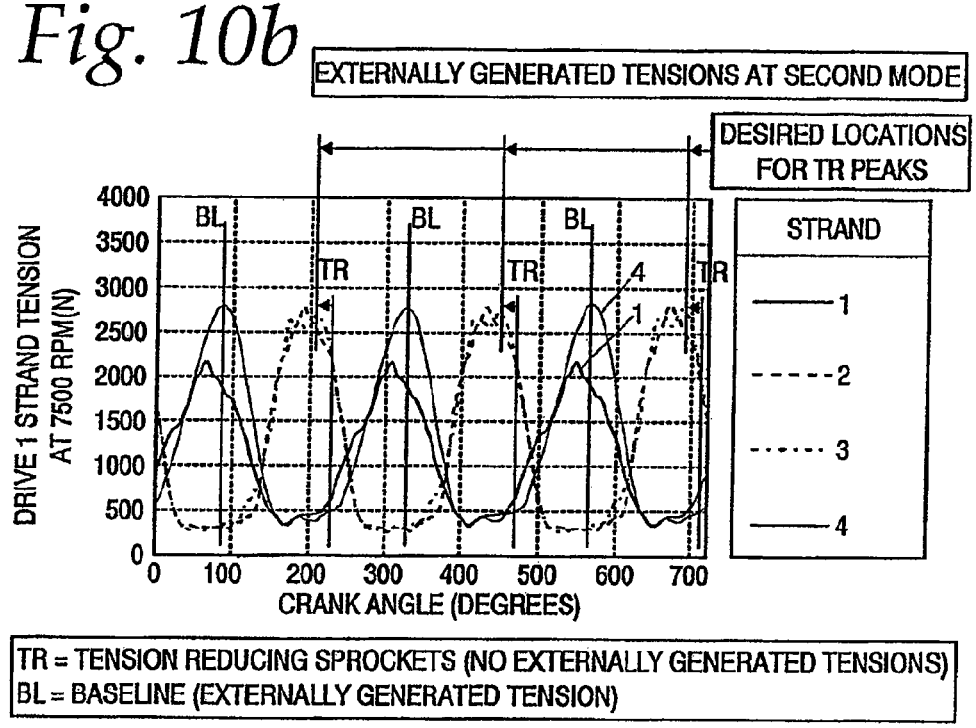
FIG. 10b shows the variation in tensions on individual chain strands as a function of crank angle for a 1.0 mm tension reducing sprocket on shaft 1 of FIG. 8 at 0 degrees and with a 1.15 mm tension reducing sprocket on shaft 3 at −20 degrees with externally generated tensions at second resonance mode.

Generating the data shown in FIGS. 9a and b provides the relative radial amplitude between the two tension reducing sprockets and provides a starting point for providing the relative angular orientation of the sprockets through simulation tests of the system to confirm that first mode resonance is not excited and that tensions are generated at the second mode of resonance. In this example, simulation tests are run with a 1.0 mm sprocket on shaft 1 of FIG. 8 (sprocket 302) at 0 degrees and with a 1.15 mm sprocket on shaft 3 of FIG. 8 (sprocket 304) at −20 degrees with no externally generated tensions, see FIG. 10. As can be seen from FIG. 10, with both tension reducing sprockets, the first resonance mode tensions cancel and there is more excitation at the second resonance mode. These results confirm that the two tension reducing sprockets cancel the tensions of the other at first mode and add together to excite the second mode resonance tensions. Hence, the next thing that is done in orienting the sprockets relative to each other is to adjust the tension reducing sprocket amplitude and orientation to cancel the externally generated tensions at the second resonance mode. Typically the radial amplitude will be adjusted so that the tension reducing sprockets generate the same tension levels as the externally generated tensions at second mode. The tension reducing sprocket orientation is adjusted (both sprockets shifted the same amount) so that strand 312 (strand 4) tension peaks from the tension reducing sprockets occur half way between the strand 312 (strand 4) tension peaks from external tension sources (and possibly a first mode tension reducing sprocket). See FIG. 10a (where there is no externally generated tensions and) and 10b, especially FIG. 10b where with externally generated tensions at second mode, the right bank (sprocket 302) is shifted to the left in the plot of crank angle in degrees versus strand tension (N) at 7500 rpm. As generally seen in FIG. 10, the results confirm that the tension reducing sprockets cancel the other's tension at first mode and add together to excite second mode.

It is desired that the strand 4 (312) tension peaks with both tension reducing sprockets to occur half way between the strand 4 (312) tension peaks from the baseline system. The initial estimate was close. Both tension reducing sprockets should be advance about 20 crank degrees (10 cam degrees). Normally it is desired that the strand 4 maximum tensions with both tension reducing sprockets match the maximum stand 4 tension from the baseline. In this case, the tension reducing sprocket radial amplitudes are already quite large and may cause unwanted strand vibrations. To limit the excitation to strand vibration, radial variation will be kept as it is and only partially cancel the second mode tensions. Then it should be confirmed that the two tension reducing sprockets partially cancel the second mode tensions.

Figure 11:
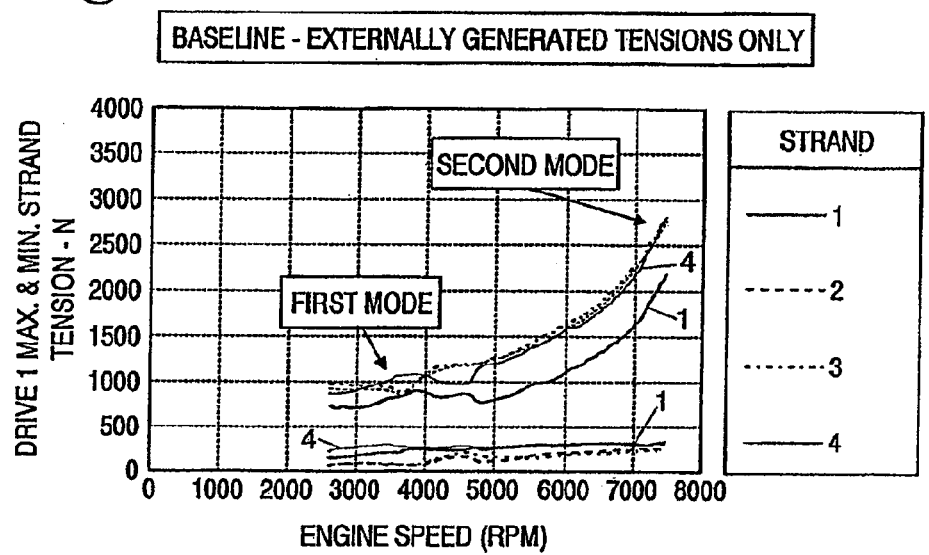
FIG. 11 shows a base line for externally generated tensions only for a system as shown in FIG. 8 with a tension reducing sprocket having a 1.0 mm radial amplitude on shaft 1 and a tension reducing sprocket having a 1.15 mm radial amplitude on shaft 3.
Figure 11A:
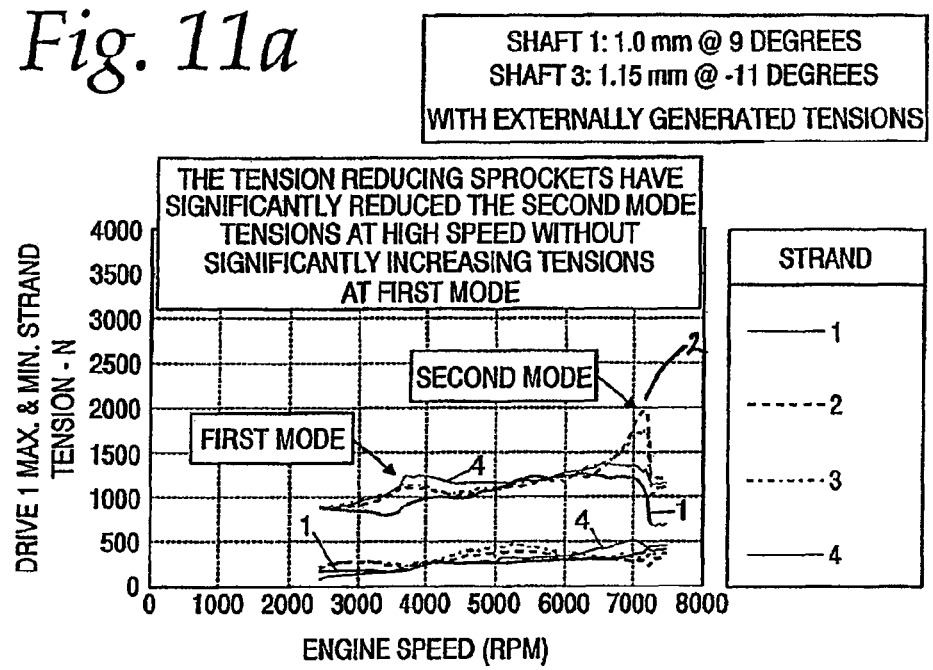
FIG. 11a shows variations in tensions in a chain a sprocket system with externally generated tensions for a system as shown in FIG. 8 with a tension reducing sprocket having a 1.0 mm radial amplitude on shaft 1 rotated 9 degrees and a tension reducing sprocket having a 1.15 mm radial amplitude on shaft 3 rotated −11 degrees.
Figure 12:
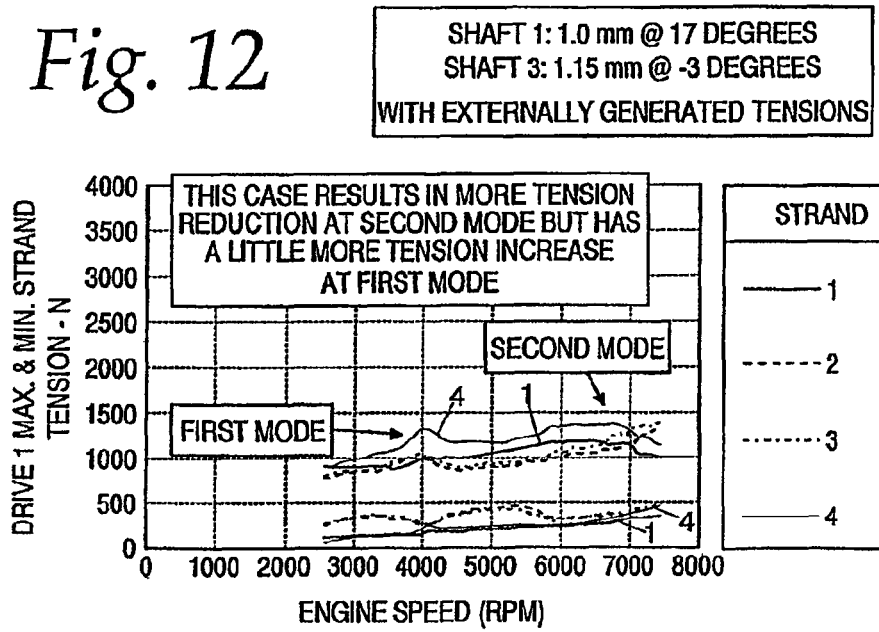
FIG. 12 shows variations in tensions in a chain a sprocket system with externally generated tensions for a system as shown in FIG. 8 with a tension reducing sprocket having a 1.0 mm radial amplitude on shaft 1 rotated 17 degrees and a tension reducing sprocket having a 1.15 mm radial amplitude on shaft 3 rotated −3 degrees.

The base line for externally generated tensions only for a system as shown in FIG. 8 is illustrated in FIG. 11 for shaft 1 which has a 1.0 mm sprocket (sprocket 302) and shaft 3 (sprocket 304) has a 1.15 mm sprocket. As seen in FIG. 11a, when shaft 1 (sprocket 302) has a 1.0 mm sprocket which is rotated 9 degrees and shaft 3, sprocket 304 is 1.15 min and is rotated −11 degrees, the tension reducing sprockets significantly reduce the second mode tension at high speed without significantly increasing tension at first mode. Using this as a starting point, additional simulations can be done which continue to vary tension reducing sprocket orientation to try to further reduce the maximum tensions in the system. A simulation with shaft 1 (sprocket 302) at 1.00 mm and rotated 17 degrees and shaft 3 (sprocket 304) at 1.15 mm rotated −3 degrees and the system having externally generated tensions shows that there is more tension reduction at the second resonance mode, but there is a small tension increase at the first resonance mode which is shown in FIG. 12.

EXAMPLE 3

A Tension Reduction in a V8 Chain Driving Both Engine Banks

Figure 13B:
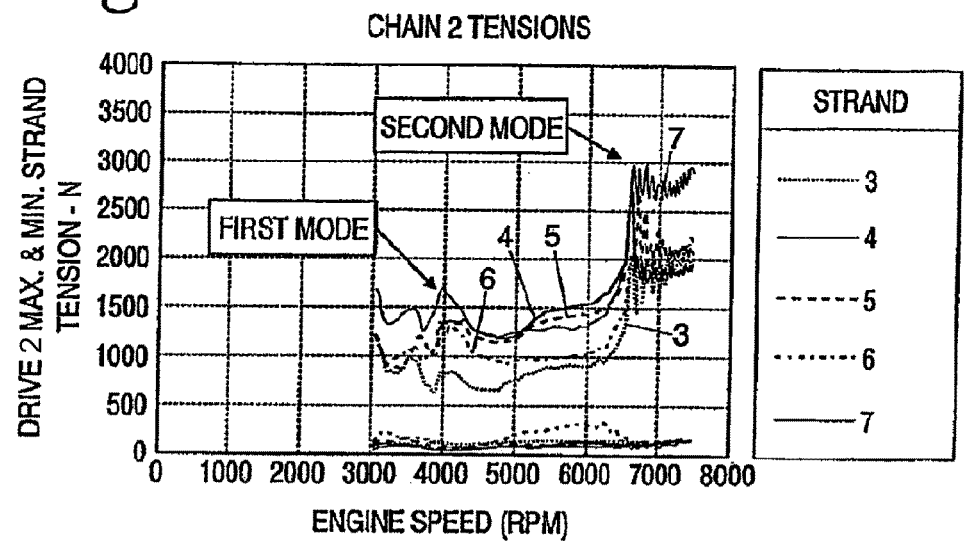
Figure 13C:
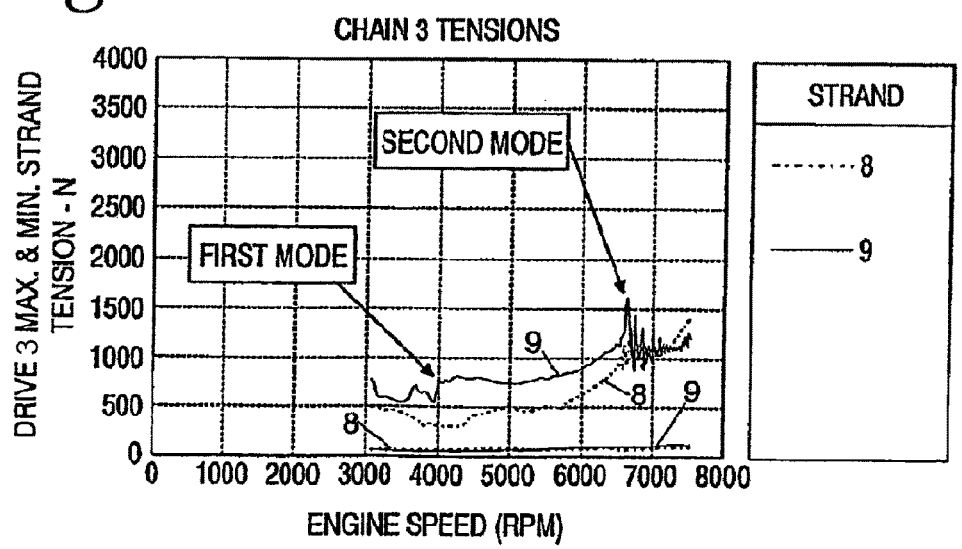

FIG. 13 shows a seven sprocket system where drive sprocket 402 on shaft 0 is connected to sprocket 404 on shaft 1 by chain strands 1 (416) and 2 (418). Sprocket 404 on shaft 1 is connected to sprocket 414 on shaft 6 by chain strand 3 (420) and sprocket 406 on shaft 2 is connected to sprocket 414 by chain strands 9 (432) and 8 (430). Sprocket 406 on shaft 2 is connected to sprocket 408 on shaft 3 by chain strand 4 (422). Sprocket 408 is connected to sprocket 410 on shaft 4 by chain strand 5 (424). Sprocket 410 is connected to sprocket 412 on shaft 5 by chain strand 6 (426). Finally sprocket 412 is connected to sprocket 404 via chain strand 7 (428). FIGS. 13a, 13b and 13c illustrate the tensions on chain strands 1, 2 and 3 respectively at the first and second resonance modes when all the sprockets are straight sprockets.

Figure 14A:
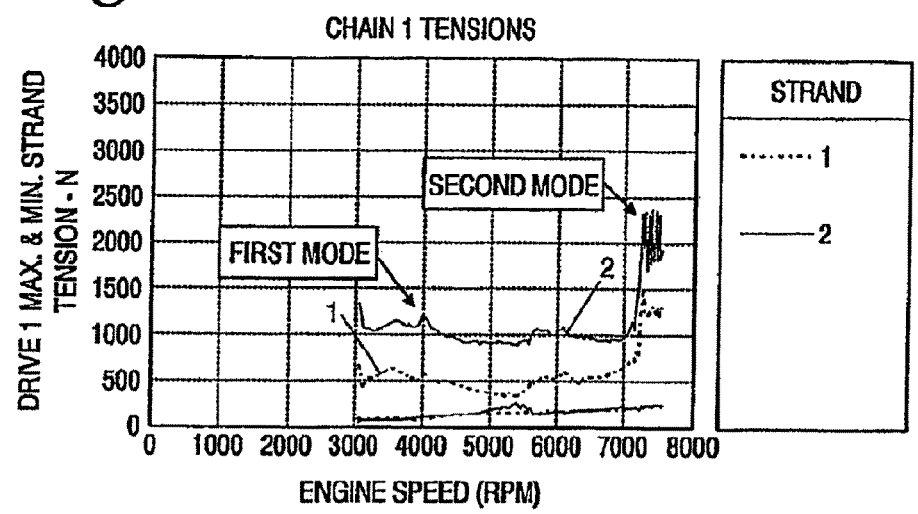
FIGS. 14a, 14b, and 14c illustrate the tensions on chain strands 1, 2, and 3, respectively, of the seven sprocket system shown in FIG. 13 at the first and second resonance mode when the tension reducing sprocket on shaft 2 in the sprocket system shown in FIG. 13 has a 0.5 min radial amplitude maximum at 18 degrees and when the tension reducing sprocket on shaft 5 shown in the sprocket system of FIG. 13 has a 1.3 mm radial amplitude maximum at −112 degrees.
Figure 14B:
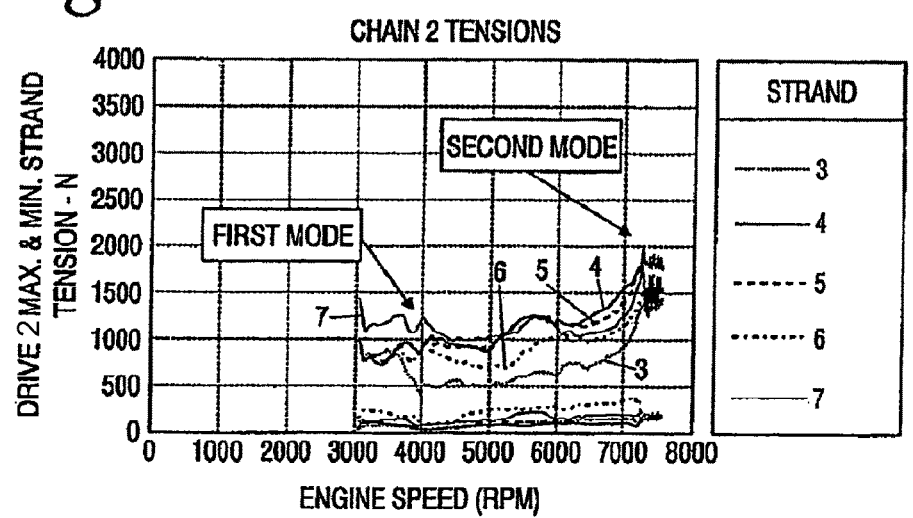
Figure 14C:
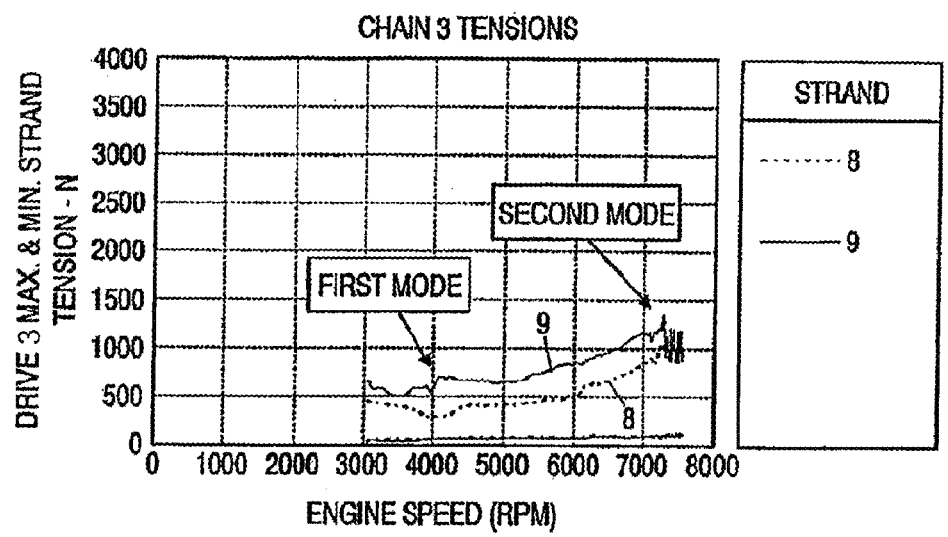

When sprockets 406 and 412 are converted to third order tension reducing sprockets, significant tension reduction of tensions at the second resonance mode can be achieved without increasing tension at the first resonance mode. When the sprocket 406 on shaft 2 has 0.5 mm radial amplitude maximum at 18 degrees and when sprocket 412 on shaft 5 has a 1.3 mm radial amplitude maximum at −112 degrees the tensions on chain strands 1, 2, and 3 are illustrated in FIGS. 14a, 14b and 14c, respectively.

EXAMPLE 4

Figure 15A:
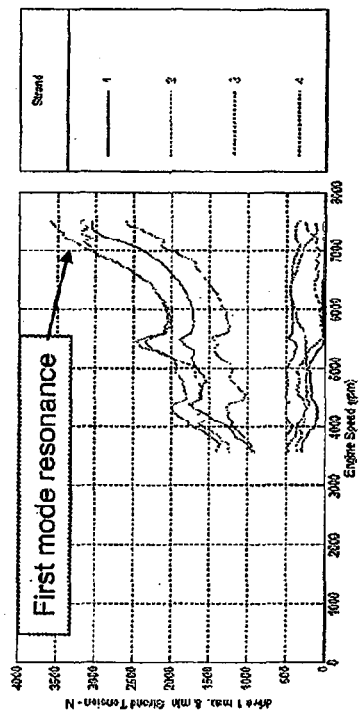
FIGS. 15a and 15b show the tension plots for the system in FIG. 7 for engine speed in rpm versus strand tension in Newtons.
Figure 15B:
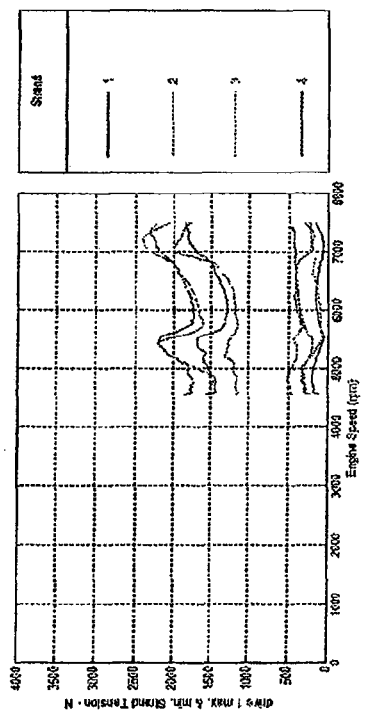

Effect of Tension Reducing Sprockets on First Mode Tensions Relative to a Straight Sprocket FIGS. 15a and 15b show the tension plots for the system 200 shown in FIG. 7 for engine speed in rpm versus strand tension in Newtons. The plot 15a shows the chain tensions where each of the sprockets is a straight sprocket and external excitations are applied to the system (in this instance crank torsionals, as well fluctuating valve train/cam torque loads). As discussed above, the other sprockets in the system include sprocket 206 and drive sprocket 208 (here a straight sprocket). The chain has strand 210, or strand 1, that runs between the exhaust sprocket 202 (here a straight sprocket) and drive sprocket 208. Chain strand 212, or strand 4, runs between drive sprocket 208 and sprocket 206. Strand 214, or strand 3, runs between sprocket 206 and sprocket 204 (here a straight sprocket). Strand 216, or strand 2 runs between sprocket 204 and sprocket 202. As indicated in FIG. 15a, there are very significant tension increases or spikes at the first resonance mode in each chain strand.

FIG. 15b is a chain tension plot for the system shown in FIG. 7 with the two third order tension reducing sprockets discussed in Example 1 above. The tension reducing sprockets 202 and 204 (one on each cam shaft) are oriented as shown and discussed in FIG. 7d, namely, the maximum radius advanced 16 degrees. As shown in FIG. 15b, the first mode resonance tensions are significantly reduced, as is the maximum chain tension which occurs at such first mode, relative to the straight sprocket system.

Figure 16:
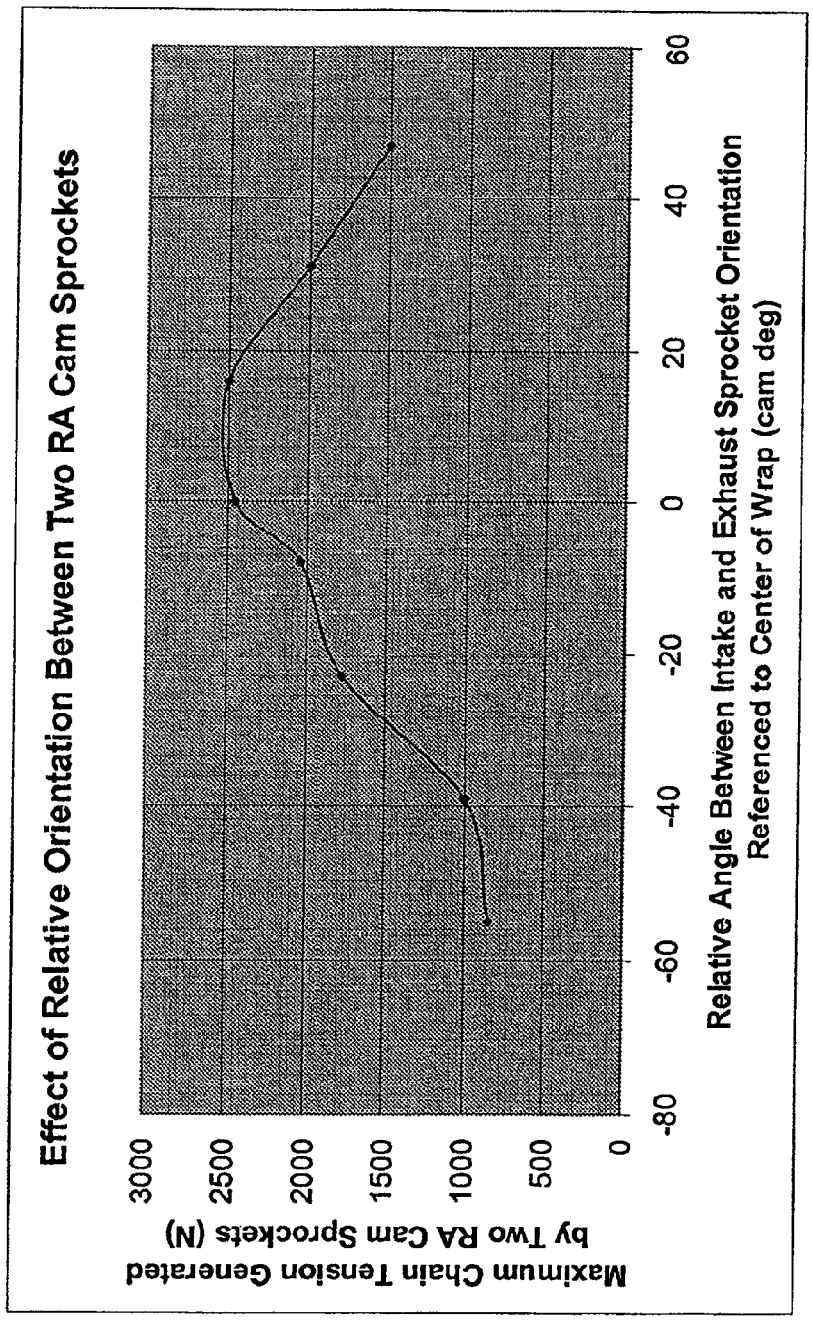
FIG. 16 is a graph illustrating the relationship between the relative angles between the tension reducing sprocket orientations of the system shown in FIG. 7 discussed and maximum chain tensions generated by the two tension reducing driven sprocket system shown in FIG. 7d. They are referenced to the center of the chain wrap in cam degrees. For the purposes of this FIG. 16 the negative signs for the relative angles are reversed, e.g. the −16.5 root angle in FIGS. 7a-7h, would be indicated as 16.5 degrees in FIG. 16.

FIG. 16 shows the relationship between the relative angles between the tension reducing sprocket orientations of the system discussed in Example 1 and maximum chain tensions generated by the two tension reducing sprocket system discussed in Example 1 (without external excitations such as discussed with reference to FIGS. 7a-7h). They are referenced to the center of the chain wrap in cam degrees. For the purposes of this FIG. 16 the negative signs for the relative angles are reversed, e.g. the −16.5 root angle in FIGS. 7a-7h, would be indicated as 16.5 degrees in FIG. 16.

EXAMPLE 5

Effect of Tension Reducing Sprockets Used on Drive and Driven Sprockets

FIG. 17 shows a system 500 with a driving sprocket, and two driven sprockets. For the purposes of this example, the chain tensions generated in this system 500 using straight sprockets and subject to external excitations are compared with the tensions in the system 500 using tension reducing sprockets and subject to the same external excitations. The system 500 using the tension reducing sprockets use a straight sprocket 502 (driven sprocket representing an exhaust cam sprocket in this example), a tension reducing sprocket 504 (driven sprocket representing an intake cam sprocket in this example) and a tension reducing sprocket 508 (driving sprocket representing a crank sprocket in this example). A chain having strand 510 or strand 1 runs between the exhaust tension reducing sprocket 502 and tension reducing drive sprocket 508. Chain strand 512, or strand 3, runs between drive sprocket 508 and tension reducing intake sprocket 504. Strand 514, or strand 2, runs between intake sprocket 504 and exhaust sprocket 502.

Each of the tension reducing sprockets are provided with pattern of pitch radii that repeats with each rotation of the sprocket. The angular variation of the pitch radii, in addition, is adjusted to ensure that the chain pitch length (distance between link pin axes) is maintained at approximately a constant length where the chain engages the sprockets.

The tension reducing sprocket 504 (intake) is provided with a maximum of approximately 1 mm radial amplitude relative to a straight sprocket of the same size and number of teeth, which has a constant pitch radius. In this example, the radial amplitude of the tension reducing sprocket is provided by varying the pitch radii of the tension reducing sprocket from that the equivalent straight sprocket pitch radius by the amounts shown the Table 1 below. The pitch radii pattern also is indicated below in Table 1. The pitch radii pattern is directed at tension reductions at a $3^{rd}$ sprocket order and a $3^{rd}$ engine cycle order. The tension reducing sprocket 504 (intake) is oriented at a root 1 angle of approximately 5 degrees.

TABLE 1

Single Order Intake Sprocket
approx. 1 mm radial amplitude, 3rd sprocket order

| root number | radial variation (m) | pattern |
| --- | --- | --- |
| 1 | 9.585E−04 | 1 |
| 2 | 8.627E−04 | 2 |
| 3 | 5.928E−04 | 3 |
| 4 | 1.982E−04 | 4 |
| 5 | −2.463E−04 | 5 |
| 6 | −6.532E−04 | 6 |
| 7 | −9.388E−04 | 7 |
| 8 | −1.041E−03 | 8 |
| 9 | −9.388E−04 | 7 |
| 10 | −6.532E−04 | 6 |
| 11 | −2.463E−04 | 5 |
| 12 | 1.982E−04 | 4 |
| 13 | 5.928E−04 | 3 |
| 14 | 8.627E−04 | 2 |
| 15 | 9.585E−04 | 1 |
| 16 | 8.627E−04 | 2 |
| 17 | 5.928E−04 | 3 |
| 18 | 1.982E−04 | 4 |
| 19 | −2.463E−04 | 5 |
| 20 | −6.532E−04 | 6 |
| 21 | −9.388E−04 | 7 |
| 22 | −1.041E−03 | 8 |
| 23 | −9.388E−04 | 7 |
| 24 | −6.532E−04 | 6 |
| 25 | −2.463E−04 | 5 |
| 26 | 1.982E−04 | 4 |
| 27 | 5.928E−04 | 3 |
| 28 | 8.627E−04 | 2 |
| 29 | 9.585E−04 | 1 |
| 30 | 8.627E−04 | 2 |
| 31 | 5.928E−04 | 3 |
| 32 | 1.982E−04 | 4 |
| 33 | −2.463E−04 | 5 |
| 34 | −6.532E−04 | 6 |
| 35 | −9.388E−04 | 7 |
| 36 | −1.041E−03 | 8 |
| 37 | −9.388E−04 | 7 |
| 38 | −6.532E−04 | 6 |
| 39 | −2.463E−04 | 5 |

TABLE 1-continued

Single Order Intake Sprocket
approx. 1 mm radial amplitude, 3rd sprocket order

| root number | radial variation (m) | pattern |
|---|---|---|
| 40 | 1.982E−04 | 4 |
| 41 | 5.928E−04 | 3 |
| 42 | 8.627E−04 | 2 |

The tension reducing sprocket 508 (driving, crank sprocket) is provided with a maximum of approximately 0.2 mm radial amplitude relative to the pitch radius radius of a straight sprocket of the same size and number of teeth. The radial amplitude of the tension reducing sprocket is provided by varying the pitch radii of the tension reducing sprocket from that the equivalent straight sprocket pitch radius by the amounts shown the Table 2 below. The pitch radii pattern also is indicated below in Table 2. The pitch radii pattern is directed at tension reductions at a $3^{rd}$ sprocket order and a $6^{th}$ engine cycle order. The tension reducing sprocket 508 (driving, crank sprocket) is oriented at a root 1 angle of approximately 40 degrees.

TABLE 2

Single Order Crank Sprocket
approx. .2 mm radial amplitude, 3rd sprocket order

| root number | radial variation (m) | pattern |
|---|---|---|
| 1 | 1.97E−04 | 1 |
| 2 | 1.22E−04 | 2 |
| 3 | −4.63E−05 | 3 |
| 4 | −1.83E−04 | 4 |
| 5 | −1.83E−04 | 4 |
| 6 | −4.63E−05 | 3 |
| 7 | 1.22E−04 | 2 |
| 8 | 1.97E−04 | 1 |
| 9 | 1.22E−04 | 2 |
| 10 | −4.63E−05 | 3 |
| 11 | −1.83E−04 | 4 |
| 12 | −1.83E−04 | 4 |
| 13 | −4.63E−05 | 3 |
| 14 | 1.22E−04 | 2 |
| 15 | 1.97E−04 | 1 |
| 16 | 1.22E−04 | 2 |
| 17 | −4.63E−05 | 3 |
| 18 | −1.83E−04 | 4 |
| 19 | −1.83E−04 | 4 |
| 20 | −4.63E−05 | 3 |
| 21 | 1.22E−04 | 2 |

Figure 18A:
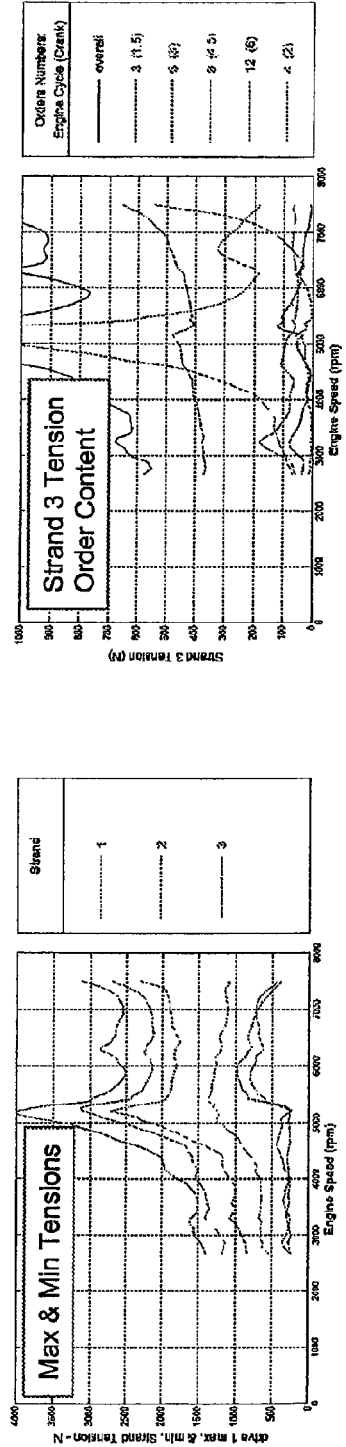
FIGS. 18a and 18b show tension plots for the system shown in FIG. 17 for engine speed in rpm versus strand tension in Newtons. The plot 18a shows the chain tensions where each of the sprockets is straight and external excitations are applied to the system (in this instance crank torsionals, as well fluctuating valve train/cam torque loads).
Figure 18B:
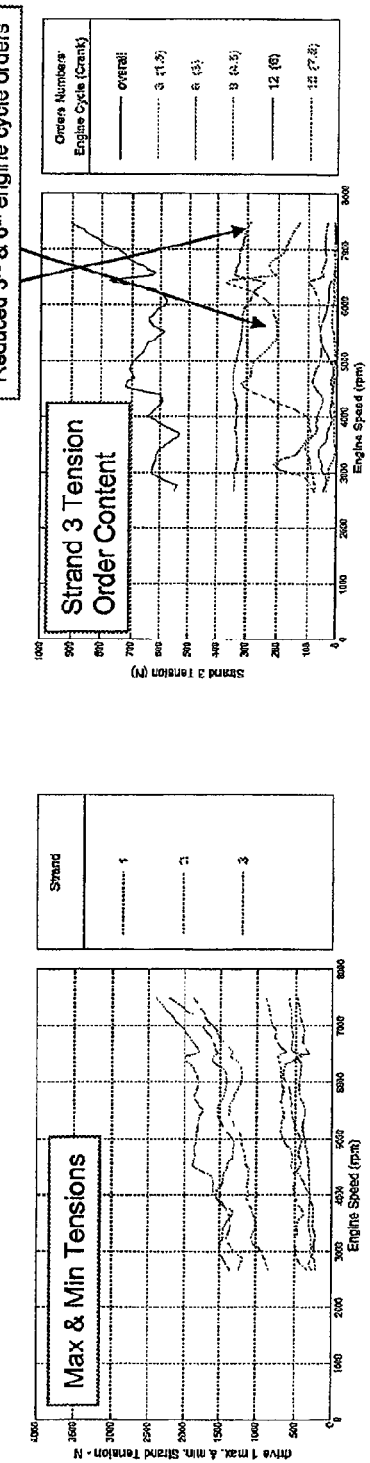

FIGS. 18*a* and 18*b* show the tension plots for the system 500 shown in FIG. 17 for engine speed in rpm versus strand tension in Newtons. The plot 18*a* shows the chain tensions where each of the sprockets is straight and external excitations are applied to the system (in this instance crank torsionals, as well fluctuating valve train/cam torque loads). In each Figure, one plot show the minimum and maximum chain tensions by strand and the other plot shows the strand 3 (strand 510) tension content by engine cycle order number (and by crank order). As indicated in FIG. 18*a*, there are very significant tension increases or spikes at the first resonance mode in each strand with the straight sprocket system. The overall strand 3 tension very significantly increased and peaked on overall order basis, and at the $6^{th}$ order at the resonance mode. Tensions, in addition, can be seen increasing at the $3^{rd}$ order and there may be upward trends at other orders.

As indicated in FIG. 18*b*, the maximum chain tensions using the tension reducing sprocket as a driven sprocket (intake sprocket 506) and a driving sprocket (crank sprocket 508) are significantly reduced relative to the straight sprocket system at each strand. Similarly, the overall strand 3 tension very significantly decreased on an overall order basis, and at the $6^{th}$ and the 3rd orders. In this example, any second resonance mode would be at a high engine speed that is not relevant to plots of FIGS. 18*a* and 18*b*.

EXAMPLE 6

Effect of Tension Reducing Sprockets Used on Drive and Driven Sprockets with Dual Order Tension Reducing Sprocket FIG. 19 shows a system 600 with a driving sprocket, and two driven sprockets. For the purposes of this example, the chain tensions generated in this system 600 using straight sprockets and subject to external excitations are compared with the tensions in the system 600 using tension reducing sprockets and subject to the same external excitations. The system 600 using the tension reducing sprockets used a straight sprocket 602 (driven sprocket representing an exhaust cam sprocket in this example), a tension reducing sprocket 604 (driven sprocket representing an intake cam sprocket in this example) and a tension reducing sprocket 608 (driving sprocket representing a crank sprocket in this example). A chain having strand 610 or strand 1 runs between the exhaust tension reducing sprocket 602 and tension reducing drive sprocket 608. Chain strand 612, or strand 3, runs between drive sprocket 608 and tension reducing intake sprocket 604. Strand 614, or strand 2, runs between intake sprocket 604 and exhaust sprocket 602

Each of the tension reducing sprockets is provided with sequence of pitch radii that provides a pattern that repeats with each rotation of the sprocket. The angular variations of the pitch radii, in addition, are adjusted to ensure that the chain pitch length (distance between link pin axes) is maintained at approximately a constant length where the chain engages the sprocket.

The tension reducing sprocket 604 (intake) is provided with a maximum of approximately 1 mm radial amplitude relative to the radial amplitude of a straight sprocket of the same size and number of teeth. In this example also, the radial amplitude of the tension reducing sprocket is provided by varying the pitch radii of the tension reducing sprocket from that the equivalent straight sprocket pitch radius by the amounts shown the Table 3 below. The pitch radii pattern also is indicated below in Table 3. The pitch radii pattern is directed at tension reductions at a $3^{rd}$ sprocket order and a $3^{rd}$ engine cycle order. The tension reducing sprocket 604 (intake) is oriented at a root 1 angle of approximately 5 degrees.

TABLE 3

Single Order Intake Sprocket
approx. 1 mm radial amplitude, 3rd sprocket order

| root number | radial variation (m) | pattern |
|---|---|---|
| 1 | 9.585E−04 | 1 |
| 2 | 8.627E−04 | 2 |
| 3 | 5.928E−04 | 3 |
| 4 | 1.982E−04 | 4 |
| 5 | −2.463E−04 | 5 |

TABLE 3-continued

Single Order Intake Sprocket
approx. 1 mm radial amplitude, 3rd sprocket order

| root number | radial variation (m) | pattern |
|---|---|---|
| 6 | −6.532E−04 | 6 |
| 7 | −9.388E−04 | 7 |
| 8 | −1.041E−03 | 8 |
| 9 | −9.388E−04 | 7 |
| 10 | −6.532E−04 | 6 |
| 11 | −2.463E−04 | 5 |
| 12 | 1.982E−04 | 4 |
| 13 | 5.928E−04 | 3 |
| 14 | 8.627E−04 | 2 |
| 15 | 9.585E−04 | 1 |
| 16 | 8.627E−04 | 2 |
| 17 | 5.928E−04 | 3 |
| 18 | 1.982E−04 | 4 |
| 19 | −2.463E−04 | 5 |
| 20 | −6.532E−04 | 6 |
| 21 | −9.388E−04 | 7 |
| 22 | −1.041E−03 | 8 |
| 23 | −9.388E−04 | 7 |
| 24 | −6.532E−04 | 6 |
| 25 | −2.463E−04 | 5 |
| 26 | 1.982E−04 | 4 |
| 27 | 5.928E−04 | 3 |
| 28 | 8.627E−04 | 2 |
| 29 | 9.585E−04 | 1 |
| 30 | 8.627E−04 | 2 |
| 31 | 5.928E−04 | 3 |
| 32 | 1.982E−04 | 4 |
| 33 | −2.463E−04 | 5 |
| 34 | −6.532E−04 | 6 |
| 35 | −9.388E−04 | 7 |
| 36 | −1.041E−03 | 8 |
| 37 | −9.388E−04 | 7 |
| 38 | −6.532E−04 | 6 |
| 39 | −2.463E−04 | 5 |
| 40 | 1.982E−04 | 4 |
| 41 | 5.928E−04 | 3 |
| 42 | 8.627E−04 | 2 |

The tension reducing sprocket 608 (driving, crank sprocket) is provided with dual order pitch pattern with the rotation of the sprocket. The dual order pattern is provided by determining a first pitch radii sequence with a preselected order pattern and a root 1 angle, and a second pitch radii sequence with another preselected order pattern and a second root 1 angle (which may be the same as or different from the root 1 angle of the first pitch sequence). The pitch radii sequences are then effectively overlaid or combined to provide a pitch pattern with the cumulative variation in radial amplitude of each pitch radii sequence relative to the radial amplitude of a straight sprocket of the same size and number of teeth. When the patterns are effectively overlaid, they are angularly displaced to account for the differences in the root one angles of the pitch sequences.

In this example, the first pitch radii sequence has a maximum of approximately 0.2 mm radial amplitude relative to the radial amplitude of a straight sprocket of the same size and number of teeth. In this example, the radial amplitude of the first pitch sequence is provided by varying the pitch radii of the tension reducing sprocket from that the equivalent straight sprocket pitch radius by the amounts shown the Table 4 below. The pattern of the pitch radii sequence also is indicated below in Table 4. The pitch radii sequence is directed at tension reductions at a $3^{rd}$ sprocket order and a $6^{th}$ engine cycle order. This pitch radii sequence is oriented at a root 1 angle of approximately 30 degrees.

TABLE 4

First Preselected Pattern - Crank Sprocket
approx. .2 mm radial amplitude, 3rd sprocket order

| root number | radial variation (m) | pattern |
|---|---|---|
| 1 | 1.97E−04 | 1 |
| 2 | 1.22E−04 | 2 |
| 3 | −4.63E−05 | 3 |
| 4 | −1.83E−04 | 4 |
| 5 | −1.83E−04 | 4 |
| 6 | −4.63E−05 | 3 |
| 7 | 1.22E−04 | 2 |
| 8 | 1.97E−04 | 1 |
| 9 | 1.22E−04 | 2 |
| 10 | −4.63E−05 | 3 |
| 11 | −1.83E−04 | 4 |
| 12 | −1.83E−04 | 4 |
| 13 | −4.63E−05 | 3 |
| 14 | 1.22E−04 | 2 |
| 15 | 1.97E−04 | 1 |
| 16 | 1.22E−04 | 2 |
| 17 | −4.63E−05 | 3 |
| 18 | −1.83E−04 | 4 |
| 19 | −1.83E−04 | 4 |
| 20 | −4.63E−05 | 3 |
| 21 | 1.22E−04 | 2 |

The second pitch radii sequence has a maximum of approximately 0.05 mm radial amplitude relative to the radial amplitude of a straight sprocket of the same size and number of teeth. The radial amplitude of the second pitch radii sequence is provided by varying the pitch radii of the tension reducing sprocket from that the equivalent straight sprocket pitch radius by the amounts shown the Table 5 below. The pattern of the pitch radii sequence also is indicated below in Table 5. The pitch radii sequence is directed at tension reductions at a $2^{nd}$ sprocket order and a $4^{th}$ engine cycle order. This pitch radii sequence is oriented at a root 1 angle of approximately −12.14 degrees.

TABLE 5

Single Order Crank Sprocket
approx. .05 mm radial amplitude, 2nd sprocket order

| root number | radial variation (m) | pattern |
|---|---|---|
| 1 | 4.99E−05 | 1 |
| 2 | 4.12E−05 | 3 |
| 3 | 1.83E−05 | 5 |
| 4 | −1.11E−05 | 7 |
| 5 | −3.67E−05 | 9 |
| 6 | −4.95E−05 | 11 |
| 7 | −4.51E−05 | 10 |
| 8 | −2.50E−05 | 8 |
| 9 | 3.74E−06 | 6 |
| 10 | 3.11E−05 | 4 |
| 11 | 4.77E−05 | 2 |
| 12 | 4.77E−05 | 2 |
| 13 | 3.11E−05 | 4 |
| 14 | 3.74E−06 | 6 |
| 15 | −2.50E−05 | 8 |
| 16 | −4.51E−05 | 10 |
| 17 | −4.95E−05 | 11 |
| 18 | −3.67E−05 | 9 |
| 19 | −1.11E−05 | 7 |
| 20 | 1.83E−05 | 5 |
| 21 | 4.12E−05 | 3 |

The combined pitch radii sequence providing the final dual order pitch pattern for the driving sprocket 608 (crank) is shown below in Table 6. As can be seen, the dual order pattern repeats with the rotation of the sprocket. A Fourier series of the dual order pattern also may be used which creates a curve representative of pitch or root radii versus sprocket position of (1) the emulating sequence of the combined two pitch radii patterns or (2) the sequence of the variation from mean pitch radii or mean root radii of the combined patterns, to provide amplitudes of the order which is consistent with a sprocket of the same orders as the above referenced combined repeating pattern of pitch or root radii which is effective for overall tension reduction in the chain.

TABLE 6

Dual Order Crank Sprocket
Combined approx. .2 mm and .05 mm with desired
relative orientation

| root number | radial variation (m) | pattern |
|---|---|---|
| 1 | 2.017E−04 | 2 |
| 2 | 9.846E−05 | 7 |
| 3 | −9.111E−05 | 15 |
| 4 | −2.331E−04 | 21 |
| 5 | −2.201E−04 | 20 |
| 6 | −5.736E−05 | 13 |
| 7 | 1.405E−04 | 6 |
| 8 | 2.374E−04 | 1 |
| 9 | 1.719E−04 | 3 |
| 10 | −4.522E−06 | 11 |
| 11 | −1.637E−04 | 18 |
| 12 | −1.932E−04 | 19 |
| 13 | −8.229E−05 | 14 |
| 14 | 7.331E−05 | 9 |
| 15 | 1.512E−04 | 5 |
| 16 | 9.543E−05 | 8 |
| 17 | −4.503E−05 | 12 |
| 18 | −1.534E−04 | 17 |
| 19 | −1.354E−04 | 16 |
| 20 | 1.990E−06 | 10 |
| 21 | 1.543E−04 | 4 |

Figure 20A:
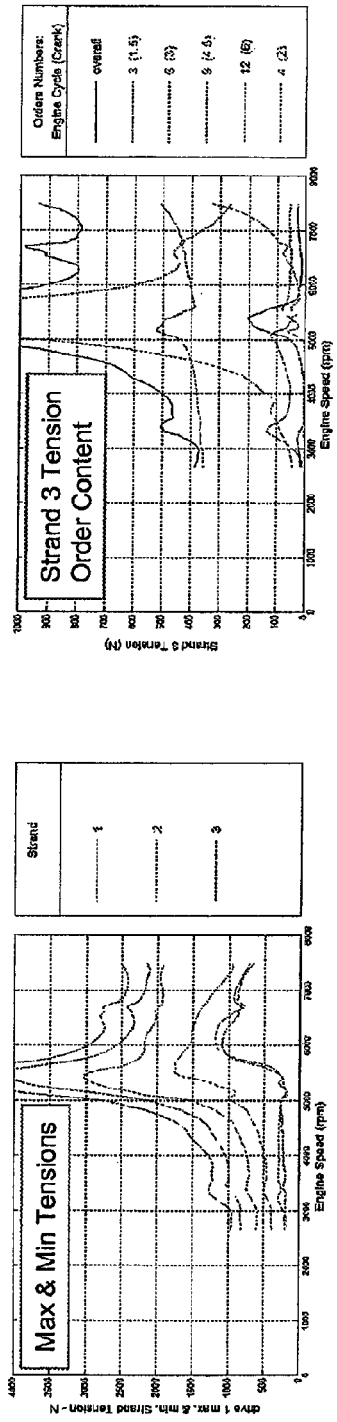
FIGS. 20a, 20b, 20c and 20d show tension plots for the system FIG. 19 for engine speed in rpm versus strand tension in Newtons.
Figure 20B:
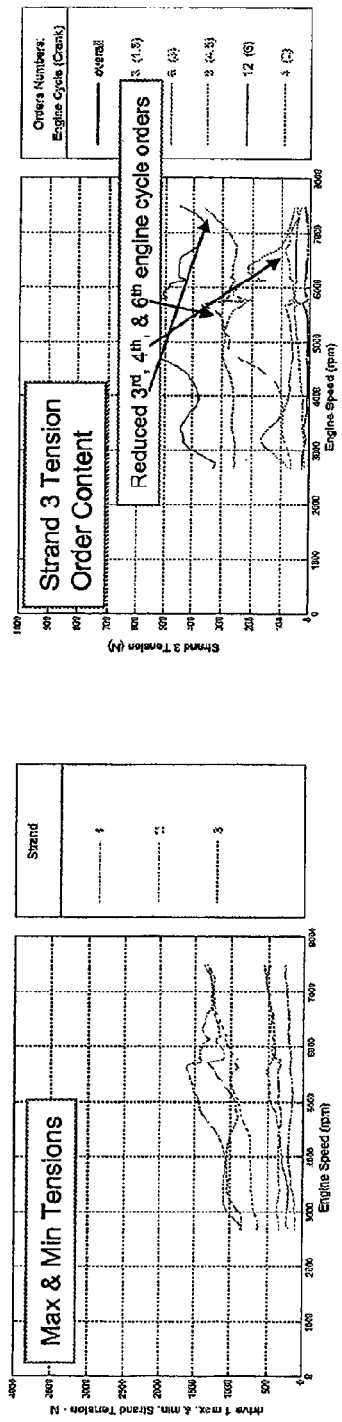

FIGS. 20a and 20b show the tension plots for the system 600 shown in FIG. 19 for engine speed in rpm versus strand tension in Newtons. The plot 20a shows the chain tensions where each of the sprockets is straight and external excitations are applied to the system (in this instance crank torsionals, as well fluctuating valve train/cam torque loads). In each Figure, one plot shows the minimum and maximum chain tensions by strand and the other plot shows the strand 3 (strand 610) tension content by engine cycle order number (and by crank order). As indicated in FIG. 20a, there are very significant tension increases or spikes at the first resonance mode in each strand with the straight sprocket system. The overall strand 3 order tensions very significantly increased and peaked on overall order basis, and at the $6^{th}$ order at the resonance mode. Tensions, in addition, can be seen increasing at the $3^{rd}$ and $4^{th}$ orders, and there may be upward trends at other orders.

As indicated in FIG. 20b, the maximum chain tensions using the tension reducing sprocket as driven sprocket (intake sprocket 606) and a tension reducing driving sprocket (crank sprocket 608) with a dual order pattern are significantly reduced relative to the straight sprocket system at each strand. Similarly, the overall strand 3 tension very significantly decreased on overall order basis, and at the $6^{th}$, $4^{th}$ and the $3^{rd}$ orders. In this example, any second resonance mode would be at a high engine speed that is not relevant to the plots of FIGS. 20a and 20b.

Figure 20C:
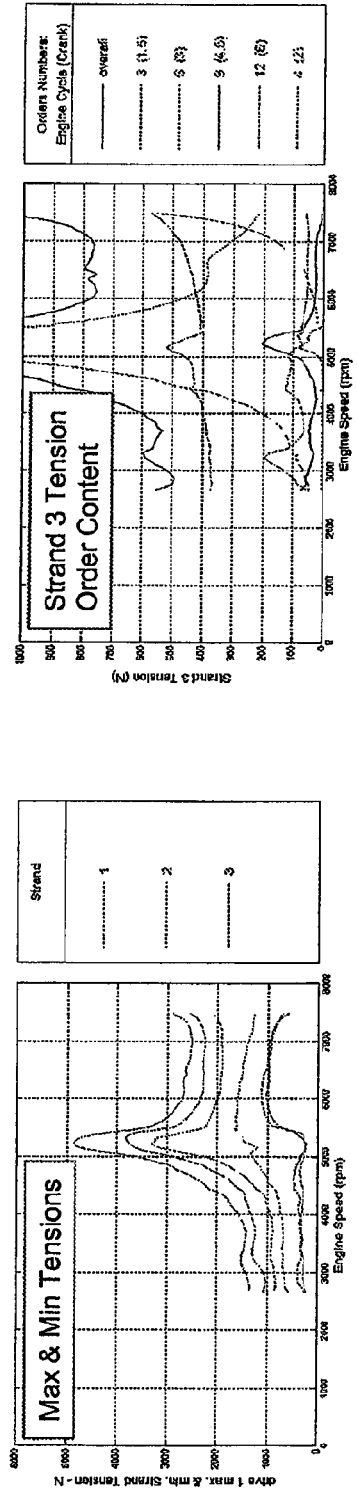
Figure 20D:
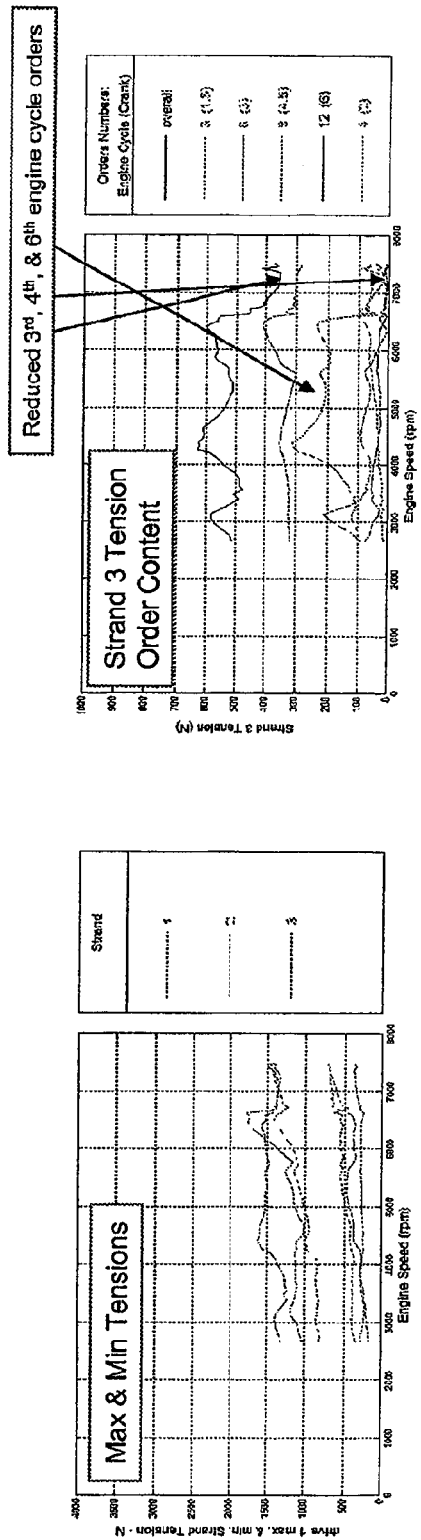

FIGS. 20c and 20d show tension plots for the system 600 with the above mentioned straight sprockets compared with the system using the above mentioned single order tension reducing driven sprocket 606 (intake) and above mentioned dual order driving sprocket 608 (crank sprocket). In this example, the external excitations are modified. As indicated in FIG. 20c, again, there are very significant tension increases or spikes at the first resonance mode in each strand with the straight sprocket system. The overall strand 3 tensions very significantly increased and peaked on overall order basis, and at the $6^{th}$ order at the resonance mode. Tensions, in addition, can be seen increasing at the $3^{rd}$ and $4^{th}$ orders, and there may be upward trends at other orders.

As indicated in FIG. 20d, once again, the maximum chain tensions using a single order driven sprocket 606 (intake) and dual order driving sprocket 608 (crank) are reduced relative to the straight sprocket system at each strand. Similarly, the overall strand 3 tension very significantly decreased on overall order basis, at the $6^{th}$, $4^{th}$ and the $3^{rd}$ orders. In this example, any second resonance mode would be at a high engine speed that is not relevant to plots of FIGS. 20c and 20d.

EXAMPLE 7

Figure 21:
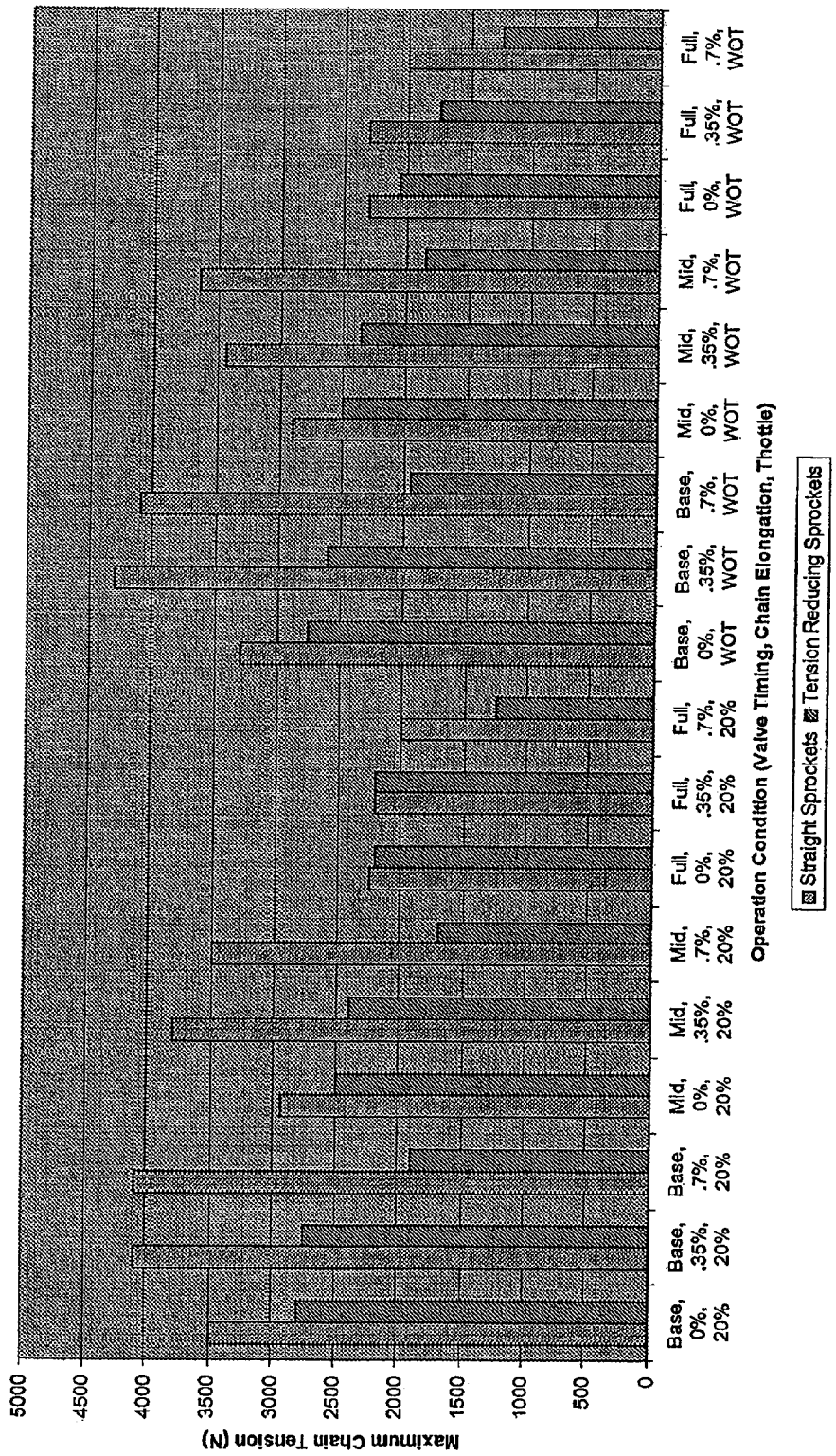
FIG. 21 summarizes the tension reductions relative to a straight sprocket system provided the by the system shown and discussed in FIG. 8 above as applied to a V6 engine chain drive system at various operating conditions. The maximum chain tensions (which normally occur in a resonance mode) are reported along the Y-axis in Newtons for a range of different operating conditions. The operating conditions are indicated in the rows along the X-axis. The conditions in the first row are valve timing (Base, Mid and Full), chain elongation (0%, 0.35%, and 0.70%) and throttle (20% and WOT-wide open throttle).

Effect of Tension Reducing Sprockets Used on Driven Sprockets at Varying Operating Conditions The graph of FIG. 21 summarizes the tensions reductions relative to a straight sprocket system provided the by the system shown and discussed in FIG. 8 above and Example 2, as applied to a V6 engine chain drive system at various operating conditions. As mentioned above, the tension reducing sprockets are driven sprockets, in this example, sprockets 302 and 304. The maximum chain tensions (which normally occur in a resonance mode) are reported along the Y-axis in Newtons for a range of different operating conditions. The operating conditions are indicated in the rows along the X-axis. The conditions in the first row are valve timing (Base, Mid and Full), chain elongation (0%, 0.35%, and 0.70%) and throttle (20% and WOT—wide open throttle).

The valve timing refers to a base setting with the exhaust valve timing advanced to the earliest point in the engine cycle and the intake valve timing is set at the latest point in the engine cycle. The full valve timing is where the intake valve timing advanced to the earliest point in the engine cycle and the exhaust valve timing set at the latest point in the engine cycle. The mid timing is at the approximate mid-point between the full and base timing settings. The chain elongation refers to chain wear conditions where the chain is elongated approximately 0%, 0.35% and 0.70%. The approximately 0.35% condition represents a chain with moderate to heavy wear, and the approximately 0.70% condition represents a chair near or past the end of its useful life. The throttle condition is where the throttle is set at 20% of the maximum and the WOT (wide open throttle) setting is the maximum throttle setting.

As shown in FIG. 21, the use of the tension reducing sprockets provided substantial reductions in maximum chain tension over a wide range of operating conditions. In this example, the tension reducing sprockets were designed for reducing tensions due to external excitation conditions typical of the "mid" valve timing conditions and approximately 0.35% chain wear conditions, with the goal of obtaining chain tensions around 2500 N across the range of operating conditions. As shown in FIG. 21, the substitution of the tension reducing sprockets as discussed above in Example 2 for straight sprockets reduced chain tensions from unacceptable levels in this example (significantly above 2500 N) to acceptable levels, around 2500 N, over the above range of operating conditions.

Furthermore, the tension reducing sprockets and did not increase chain tensions relative to the straight sprocket system at operating conditions where the straight sprocket tensions were in or below the acceptable range. As shown in FIG. 21, where the reductions were minimal, the system with the tension reducing sprockets experienced chain tensions approximately the same as the straight sprocket system (i.e. at full valve timing, 0.35% chain elongation and 20% throttle). The pitch patterns of the tension reducing sprockets also may be modified to account for variations in system conditions and external excitations to obtain tension reduction benefits at specific operating conditions or operating condition ranges.

What is claimed is:

1. A chain and sprocket system for use with a load outside the chain and sprocket system, having at least one tension source outside the chain and sprocket system, the system having a lower torsional resonance mode and a higher torsional resonance mode, the system comprising:
    at least one drive sprocket,
    at least two tension reducing sprockets, each having a repeating pattern of pitch radii repeating a number of times equal to a sprocket order at which an overall maximum tension from the tension sources at a resonance in the chain and sprocket system occurs, and
    a chain coupled to the at least one drive sprocket and the at least two tension reducing sprockets at a wrap angle,
    wherein one of the two tension reducing sprockets is coupled to the load on the tension reducing sprocket at an orientation with a maximum pitch radii of the repeating pattern at a center of the chain wrap angle and the other of the two tension reducing sprockets is coupled to the load on the tension reducing sprocket at a minimum pitch radii of the repeating pattern at the center of the chain wrap angle,
    such that tensions from the at least one tension source outside the chain and sprocket system are reduced at the higher torsional resonance mode and tensions at the lower torsional resonance mode are increased no more than 20%, such that when the at least two tension reducing sprockets are coupled to the load outside the chain system, overall maximum tension from the tension sources are reduced at the resonance in the chain and sprocket system.

2. The chain and sprocket system according to claim 1, wherein the repeating pattern of pitch radii ascends from a minimum pitch radius to a maximum pitch radius and then descends from a maximum pitch radius to a minimum pitch radius.

3. The chain and sprocket system according to claim 1, wherein the at least two tension reducing sprockets are oriented relative to each other in a way which is effective for reducing tensions from the tension sources outside the chain and sprocket system at the second resonance mode associated with the system while chain tensions are not increased.

4. The sprocket and chain system according to claim 1 wherein each of the two tension reducing sprockets have engagement surfaces around an outer circumference, the engagement surfaces of each of the tension reducing sprockets maintain a distance between adjacent pin axes of links of the chain engaged with each of the sprockets substantially constant.

5. The sprocket and chain system according to claim 1 wherein the repeating pattern of pitch radii in each of the at least two tension reducing sprockets substantially repeats at least three times with each rotation of the sprocket.

6. The sprocket and chain system according to claim 1 wherein the repeating pattern of pitch radii in each of the at least two tension reducing sprockets substantially repeats at least four times with each rotation of the sprocket.

7. The sprocket and chain system according to claim 1 wherein the pattern of pitch radii of at least one of the at least two tension reducing sprockets includes a full pattern of pitch radii and at least one less than full pattern of pitch radii, the less than full pattern having at least one pitch radii, which is in the full pattern, missing from the less than full pattern.

8. The chain and sprocket system according to claim 1 wherein the wrap angle is within a range defined by the equation $$\text{wrap angle} = 360N/\text{Order} \pm 120/\text{Order},$$

where N=1, 2, ... Order-1, and
Order means sprocket order as a result of tensioning events which originate outside the chain and/or sprocket.

9. The chain and sprocket system according to claim 1 wherein at least one tension reducing sprocket has a dual order pitch patterns that repeats with the rotation of the sprocket.

10. The chain and sprocket system according to claim 1, wherein one of the at least two tension reducing sprockets has a greater radial amplitude than an other of the at least two tension reducing sprockets.

11. The chain and sprocket system according to claim 1, wherein the pitch radii of the repeating pattern on each of the tension reducing sprockets is a maximum pitch radius at the center of the wrap angle.

12. The chain and sprocket system according to claim 1, wherein the lower torsional resonance mode corresponds to a first torsional resonance mode of the chain and sprocket system and the higher torsional resonance mode corresponds to a second torsional resonance mode of the chain and sprocket system.

13. At least two tension reducing sprockets for coupling to a chain at a wrap angle forming a chain system, the chain system for use with a load outside the chain and sprocket system the system having at least one tension source, the system having at least a lower torsional resonance mode and a higher torsional resonance mode, each of the at least two tension reducing sprockets comprising:
    a repeating pattern of pitch radii, repeating a number of times equal to a sprocket order at which an overall maximum tension from the tension sources at a resonance in the chain and sprocket system occurs, and when the at least two tension reducing sprockets are coupled to the load outside the chain system reduces overall maximum chain tension from the tension sources at a resonance in the chain and sprocket system,
    wherein one of the at least two tension reducing sprockets, being coupled to the load on the sprocket at an orientation with a maximum pitch radii of the repeating pattern at a center of the chain wrap angle and the other of the two tension reducing sprockets is coupled to the load on the tension reducing sprocket at a minimum pitch radii of the repeating pattern at the center of the chain wrap angle such that tensions from the at least one tension source outside the chain are reduced at the higher torsional resonance mode and tensions at the lower torsional resonance mode are increased no more than 20%.

14. The at least two sprockets according to claim 13 wherein the pattern of pitch radii of at least one of the at least two tension reducing sprockets includes a full pattern of pitch radii and at least one of less than full patterns of pitch radii, the less than full pattern having at least one pitch radii, which is in the full pattern, missing from the less than full pattern.

15. The at least two sprockets according to claim 13 further comprising engagement surfaces around an outer circumference, the engagement surfaces maintain a distance between adjacent pin axes of links of the chain engaged with each of the sprockets substantially constant.

16. The at least two sprockets according to claim 13, wherein the repeating pattern of pitch radii ascend from a minimum pitch radius to a maximum pitch radius and then descends from a maximum pitch radius to a minimum pitch radius.

17. The at least two sprockets according to claim 13, wherein the repeating pattern of pitch radii substantially repeats at least three times.

18. The at least two sprockets according to claim 13 wherein the repeating pattern of pitch radii substantially repeats at least four times.

19. The at least two tension reducing sprockets according to claim 13 wherein the wrap angle is defined by the equation $$\text{wrap angle} = 360N/\text{Order} \pm 120/\text{Order},$$

where $N=1, 2, \ldots \text{Order}-1$, and
Order means sprocket order.

20. The at least two tension reducing sprockets according to claim 13, wherein at least one tension reducing sprocket has a dual order pitch patterns that repeats with the rotation of the sprocket.

21. The at least two tension reducing sprockets according to claim 13, wherein the lower torsional resonance mode corresponds to a first torsional resonance mode of the chain and sprocket system and the greater resonance mode corresponds to a second torsional resonance mode of the chain and sprocket system.

22. A chain and sprocket system having a lower torsional resonance mode and a higher torsional resonance mode, comprising:
- a load outside the chain and sprocket system, the system having at least one tension source;
- at least one drive sprocket,
- at least two tension reducing sprockets, each having a pitch radii sequence, repeating a number of times equal to a sprocket order at which an overall maximum tension from the tension sources at a resonance in the chain and sprocket system occurs, and when the at least two tension reducing sprockets are coupled to the load outside the chain system, reduces the overall maximum tension from the tension sources at the resonance in the chain and sprocket system, and
- a chain coupled to the at least one drive sprocket and the at least two tension reducing sprockets at a wrap angle, wherein one of the two tension reducing sprockets is coupled to the load on the tension reducing sprocket at an orientation with a maximum pitch radii of the repeating pattern at a center of the chain wrap angle and the other of the two tension reducing sprockets is coupled to the load on the tension reducing sprocket at a minimum pitch radii of the repeating pattern at the center of the chain wrap angle, such that tensions from the at least one tension source outside the chain and sprocket system are reduced at the higher torsional resonance mode and tensions at the lower torsional resonance mode are increased no more than 20%.

23. The chain and sprocket system according to claim 22 wherein the pitch radii sequence emulates a repeating pitch radii pattern.

24. The chain and sprocket system according to claim 22, wherein the pitch radii sequence is a variation from mean pitch radii and provides an amplitude of the order which is consistent with a sprocket of the same order that has a repeating pattern of pitch radii, chosen to reduce overall maximum tension at resonance in the chain and sprocket system.

25. The chain and sprocket system according to claim 22, wherein the lower torsional resonance mode corresponds to a first torsional resonance mode of the chain and sprocket system and the greater resonance mode corresponds to a second torsional resonance mode of the chain and sprocket system.

26. The chain and sprocket system according to claim 22, wherein the wrap angle is defined by the equation $$\text{wrap angle} = 360N/\text{Order} \pm 120/\text{Order},$$

where $N=1, 2, \ldots \text{Order}-1$, and
Order means sprocket order as a result of tensioning events which originate outside the chain and/or sprocket.

27. The chain and sprocket system of claim 22, wherein pitch radii sequence ascends from a minimum pitch radius to a maximum pitch radius and then descends from a maximum pitch radius to a minimum pitch radius.

28. The chain and sprocket system according to claim 22, wherein at least one tension reducing sprocket has a dual order pitch patterns that repeats with the rotation of the sprocket.

29. The chain and sprocket system according to claim 22, wherein one of the at least two tension reducing sprockets has a greater radial amplitude than an other of the at least two tension reducing sprockets.

* * * * *